(12) United States Patent
Khammassi

(10) Patent No.: US 11,726,790 B2
(45) Date of Patent: Aug. 15, 2023

(54) PROCESSOR AND INSTRUCTION SET FOR FLEXIBLE QUBIT CONTROL WITH LOW MEMORY OVERHEAD

(71) Applicant: Intel Corporation, Santa Clara, CA (US)

(72) Inventor: Nader Khammassi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 613 days.

(21) Appl. No.: 16/712,922

(22) Filed: Dec. 12, 2019

(65) Prior Publication Data

US 2021/0182071 A1   Jun. 17, 2021

(51) Int. Cl.
| | | |
|---|---|---|
| *G06F 15/00* | (2006.01) | |
| *G06F 9/38* | (2018.01) | |
| *G06N 10/00* | (2022.01) | |
| *G06F 7/544* | (2006.01) | |
| *G06N 10/40* | (2022.01) | |
| *G06F 1/03* | (2006.01) | |

(52) U.S. Cl.
CPC .......... *G06F 9/3867* (2013.01); *G06F 1/0321* (2013.01); *G06F 7/5443* (2013.01); *G06F 9/382* (2013.01); *G06N 10/00* (2019.01); *G06N 10/40* (2022.01)

(58) Field of Classification Search
CPC .... G06F 9/3867; G06F 1/0321; G06F 7/5443; G06F 9/382; G06N 10/00; G06N 10/40
USPC .......................................................... 706/62
See application file for complete search history.

(56) References Cited

U.S. PATENT DOCUMENTS

| | | | | | |
|---|---|---|---|---|---|
| 5,117,192 | A | * | 5/1992 | Hurd ..................... | G01R 29/22 324/727 |
| 5,184,093 | A | * | 2/1993 | Itoh ........................ | H03L 7/1806 327/107 |
| 6,002,923 | A | * | 12/1999 | Sahlman .................. | H03D 7/18 332/145 |
| 6,018,316 | A | * | 1/2000 | Rudish ................. | H01Q 25/008 342/368 |

(Continued)

FOREIGN PATENT DOCUMENTS

WO    2019/182570 A1    9/2019

OTHER PUBLICATIONS

Fu, X., et al., "An experimental microarchitecture for a superconducting quantum processor", MICRO-50 '17 Proceedings of the 50th Annual IEEE/ACM International Symposium on Microarchitecture, Oct. 2017, pp. 813-825.

(Continued)

*Primary Examiner* — Ryan Jager
(74) *Attorney, Agent, or Firm* — Nicholson De Vos Webster & Elliott LLP

(57) ABSTRACT

Apparatus and method for specifying quantum operations such as qubit rotations in a quantum instruction. For example, one embodiment of an apparatus comprises: a quantum instruction processing pipeline to process a quantum instruction having one or more opcodes to specify quantum operations and one or more operands and/or fields to specify values to be used to perform the quantum operations; a quantum waveform synthesizer to synthesize a waveform to control a qubit based on the values specified by the operands and/or fields of the quantum instruction.

24 Claims, 20 Drawing Sheets

(56) References Cited

U.S. PATENT DOCUMENTS

| | | | | |
|---|---|---|---|---|
| 6,650,721 | B1* | 11/2003 | Janesch | H03C 3/095 |
| | | | | 375/376 |
| 8,125,255 | B2* | 2/2012 | Kimura | G06F 1/0328 |
| | | | | 327/147 |
| 9,385,798 | B1* | 7/2016 | Marr | H03K 19/17708 |
| 9,892,365 | B2* | 2/2018 | Rigetti | G06N 10/00 |
| 10,250,205 | B2* | 4/2019 | Tomaru | H03F 3/2171 |
| 10,274,584 | B2* | 4/2019 | Ryu | G01S 7/354 |
| 10,564,274 | B2* | 2/2020 | Delos | H01Q 3/38 |
| 10,862,465 | B1* | 12/2020 | Cohen | G06N 3/04 |
| 11,303,287 | B1* | 4/2022 | Turner | H03M 3/30 |
| 2002/0150169 | A1* | 10/2002 | Kishi | H03J 1/0008 |
| | | | | 375/295 |
| 2005/0248374 | A1* | 11/2005 | Kushnick | G01R 31/31907 |
| | | | | 327/105 |
| 2007/0192391 | A1* | 8/2007 | McEwan | G01S 7/285 |
| | | | | 708/271 |
| 2008/0122496 | A1* | 5/2008 | Wagner | G06J 1/00 |
| | | | | 327/107 |
| 2009/0108891 | A1* | 4/2009 | Sander | H03L 7/1075 |
| | | | | 327/156 |
| 2011/0260757 | A1* | 10/2011 | Cathelin | H04B 1/7174 |
| | | | | 327/105 |
| 2015/0147985 | A1* | 5/2015 | Marr | G06F 1/0321 |
| | | | | 455/91 |
| 2017/0310331 | A1* | 10/2017 | Demura | H03L 7/091 |
| 2019/0042971 | A1* | 2/2019 | Zou | G06F 15/16 |
| 2019/0042973 | A1 | 2/2019 | Zou et al. | |
| 2019/0174123 | A1* | 6/2019 | Munro | G06T 1/20 |
| 2020/0372094 | A1* | 11/2020 | Shehab | G06F 17/11 |
| 2020/0405271 | A1* | 12/2020 | Chiu | A61B 8/4444 |
| 2021/0004365 | A1* | 1/2021 | Kelly | G06N 10/00 |
| 2021/0026162 | A1* | 1/2021 | Apisdorf | G02F 7/00 |
| 2021/0173660 | A1* | 6/2021 | Hogaboam | G06F 9/3851 |
| 2021/0182071 | A1* | 6/2021 | Khammassi | G06F 1/0321 |
| 2021/0182724 | A1* | 6/2021 | Zou | G06F 9/223 |
| 2021/0182725 | A1* | 6/2021 | Zou | G06N 10/00 |
| 2021/0313973 | A1* | 10/2021 | Cohen | G06N 10/40 |
| 2021/0342728 | A1* | 11/2021 | Woerner | G06F 17/18 |
| 2021/0393288 | A1* | 12/2021 | Shelton, IV | A61B 18/1447 |
| 2022/0113977 | A1* | 4/2022 | Klochkov | G06F 9/3861 |

OTHER PUBLICATIONS

Fu, X., et al., "eQASM: An Executable Qantum Instruction Set Architecture", IEEE Symposium on High-Performance Computer Architecture, 2021, 14 pages.

Amitabh et al., "CC-Spin: Micro-architecture design for scalable control of Spin-Qubit Quantum Processor", Master Thesis, Aug. 28, 2019, 111 pages, XP055781220.

European Search Report and Search Opinion, EP App. No. 20198429.1, dated Mar. 12, 2021, 10 pages.

Fu et al., "A Microarchitecture for a Superconducting Quantum Processor", IEEE Micro, May/Jun. 2018, pp. 40-47.

Fu et al., "eQASM: An Executable Quantum Instruction Set Architecture", In Proceedings of the 25th International Symposium on High-Performance Computer Architecture (HPCA'19), Aug. 7, 2018, pp. 1-13.

\* cited by examiner

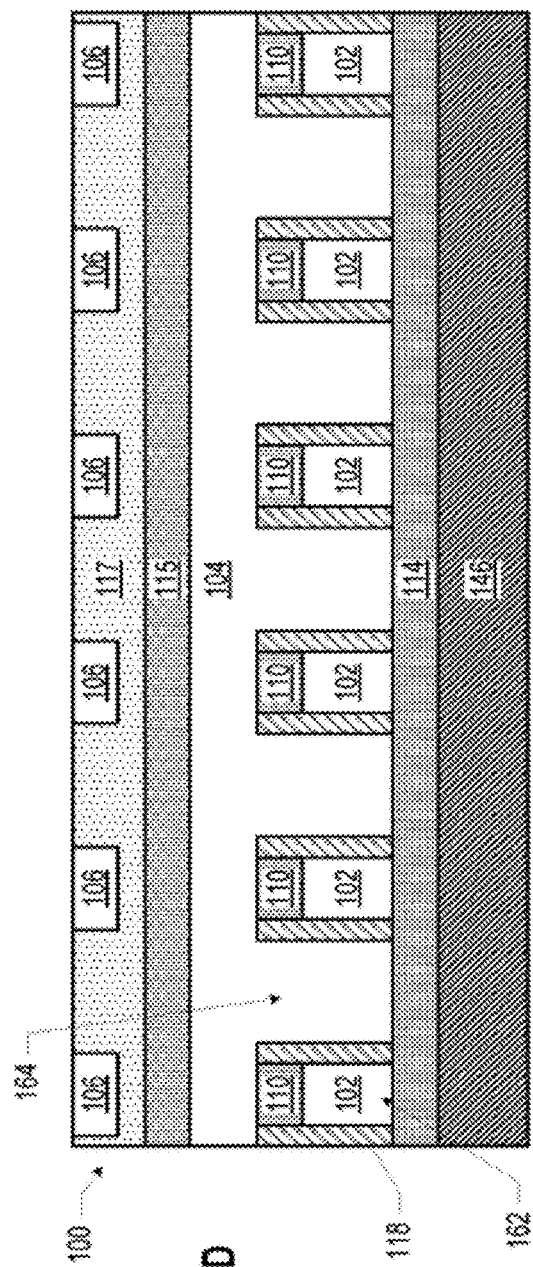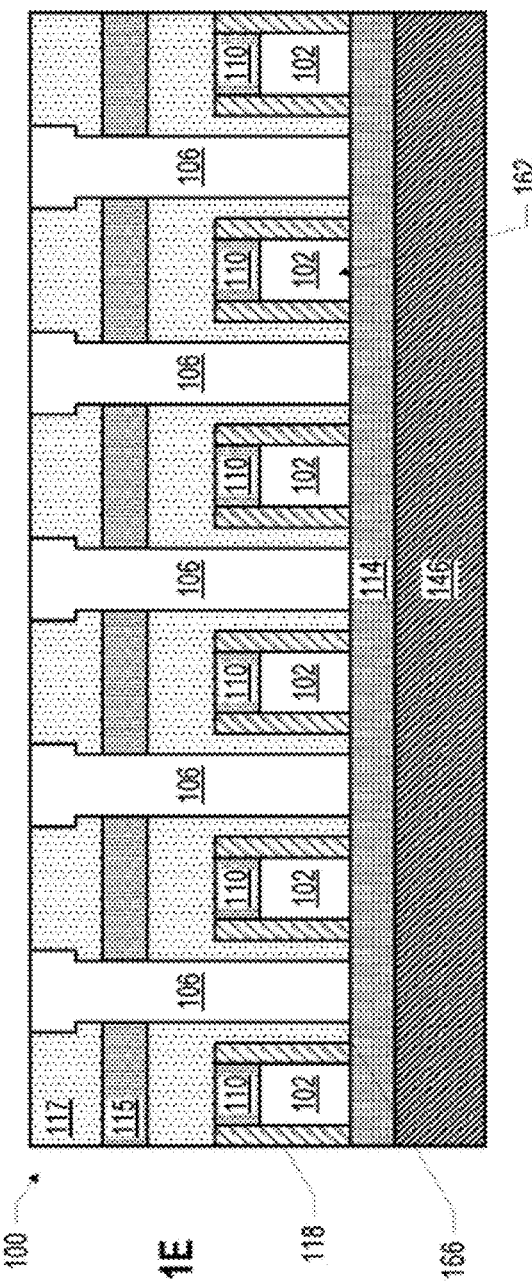
FIG. 1D
FIG. 1E

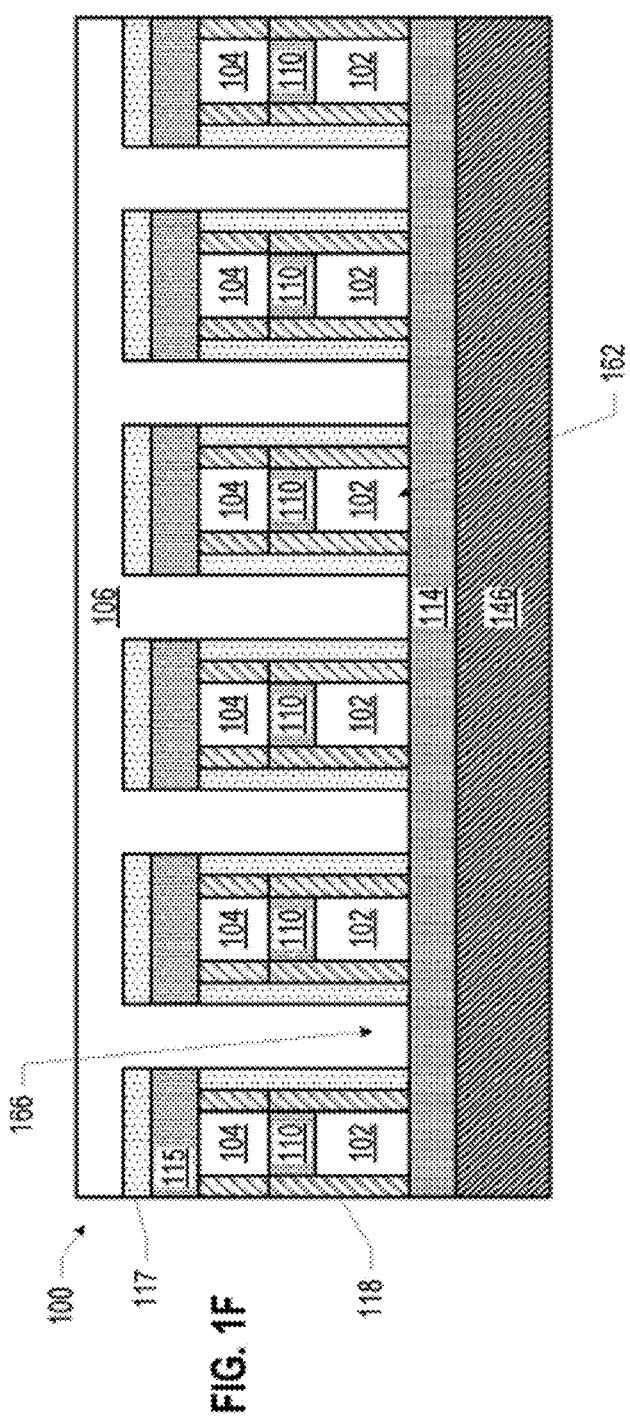

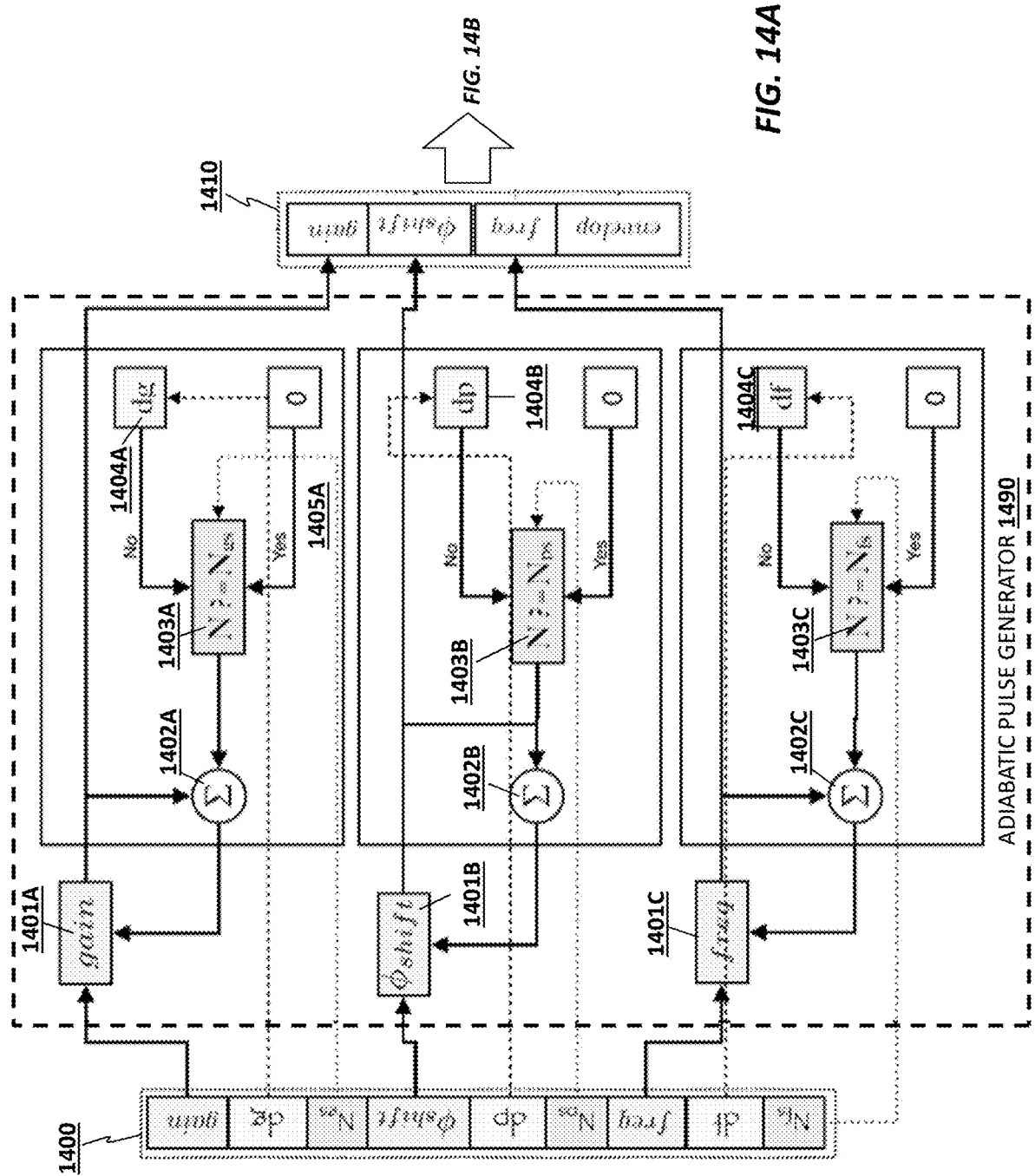

PROCESSOR AND INSTRUCTION SET FOR FLEXIBLE QUBIT CONTROL WITH LOW MEMORY OVERHEAD

BACKGROUND

Field of the Invention

The embodiments of the invention relate generally to the field of quantum computing. More particularly, these embodiments relate to a processor and instruction set for flexible qubit control with low memory overhead.

Description of the Related Art

Quantum computing refers to the field of research related to computation systems that use quantum mechanical phenomena to manipulate data. These quantum mechanical phenomena, such as superposition (in which a quantum variable can simultaneously exist in multiple different states) and entanglement (in which multiple quantum variables have related states irrespective of the distance between them in space or time), do not have analogs in the world of classical computing, and thus cannot be implemented with classical computing devices.

Qubits are generally controlled through the application of RF or DC pulses. State-of-the art qubit control relies on generating and then storing waveforms in the memory of an arbitrary waveform generator (AWG). The qubits are then controlled by triggering the waveform generator at given time and indicating which waveform is to be generated. However, this approach introduces many constraints at many levels of the control system as described in detail below.

BRIEF DESCRIPTION OF THE DRAWINGS

A better understanding of the present invention can be obtained from the following detailed description in conjunction with the following drawings, in which:

FIGS. 1A-1F illustrate various views of an example quantum dot device, in accordance with one embodiment;

FIG. 14A-B illustrates one embodiment of an architecture for initiating adiabatic pulses in response to the fields/operands of an instruction.

DETAILED DESCRIPTION

Figure 1A:
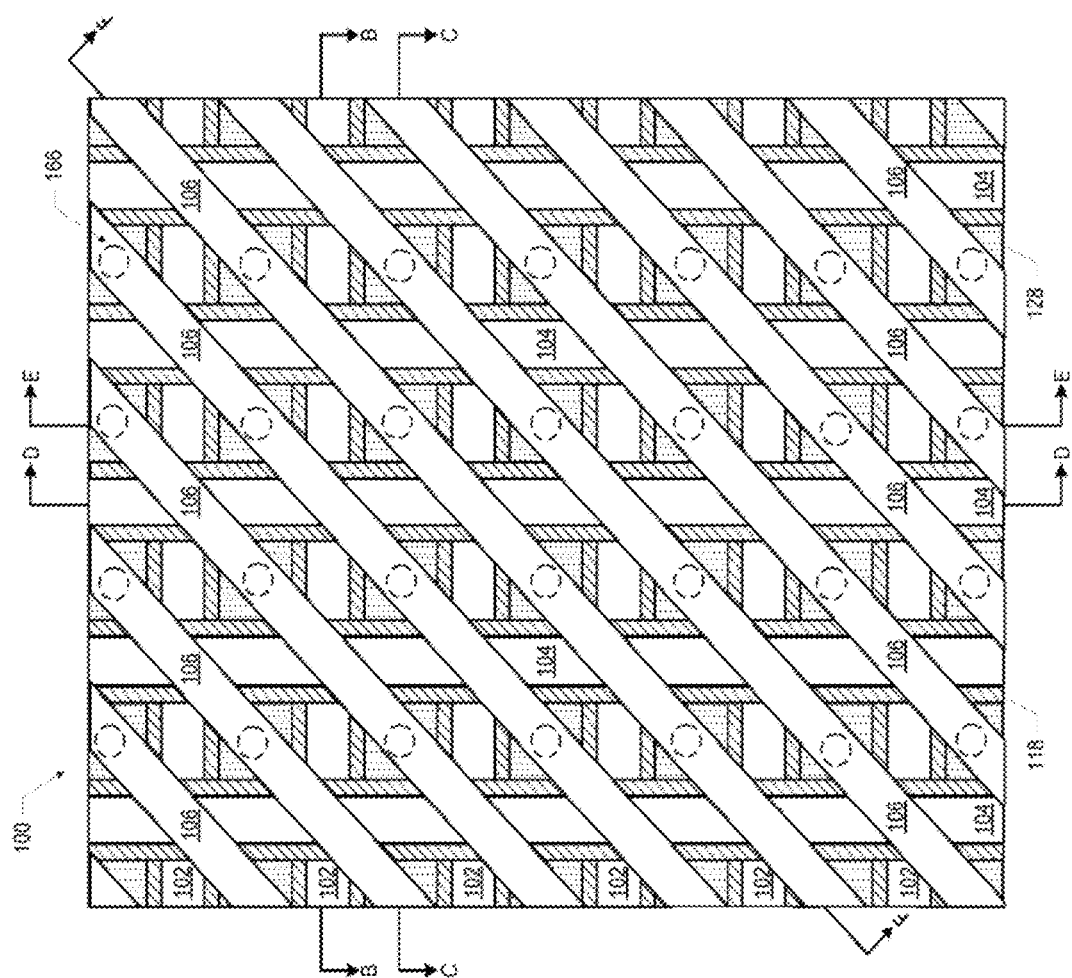

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Introduction

A quantum computer uses quantum-mechanical phenomena such as superposition and entanglement to perform computations. In contrast to digital computers which store data in one of two definite states (0 or 1), quantum computation uses quantum bits (qbits), which can be in superpositions of states. Qbits may be implemented using physically distinguishable quantum states of elementary particles such as electrons and photons. For example, the polarization of a photon may be used where the two states are vertical polarization and horizontal polarization. Similarly, the spin of an electron may have distinguishable states such as "up spin" and "down spin."

Qbit states are typically represented by the bracket notations 10) and 11). In a traditional computer system, a bit is exclusively in one state or the other, i.e., a '0' or a '1.' However, qbits in quantum mechanical systems can be in a superposition of both states at the same time, a trait that is unique and fundamental to quantum computing.

Quantum computing systems execute algorithms containing quantum logic operations performed on qubits. The sequence of operations is statically compiled into a schedule and the qubits are addressed using an indexing scheme. This algorithm is then executed a sufficiently large number of times until the confidence interval of the computed answer is above a threshold (e.g., ~95+%). Hitting the threshold means that the desired algorithmic result has been reached.

Qbits have been implemented using a variety of different technologies which are capable of manipulating and reading quantum states. These include, but are not limited to quantum dot devices (spin based and spatial based), trapped-ion devices, superconducting quantum computers, optical lattices, nuclear magnetic resonance computers, solid-state NMR Kane quantum devices, electrons-on-helium quantum computers, cavity quantum electrodynamics (CQED) devices, molecular magnet computers, and fullerene-based ESR quantum computers, to name a few. Thus, while a quantum dot device is described below in relation to certain embodiments of the invention, the underlying principles of the invention may be employed in combination with any type of quantum computer including, but not limited to, those listed above. The particular physical implementation used for qbits is orthogonal to the embodiments of the invention described herein.

Quantum Dot Devices

Quantum dots are small semiconductor particles, typically a few nanometers in size. Because of this small size, quantum dots operate according to the rules of quantum mechanics, having optical and electronic properties which differ from macroscopic entities. Quantum dots are sometimes referred to as "artificial atoms" to connote the fact that a quantum dot is a single object with discrete, bound electronic states, as is the case with atoms or molecules.

Figure 1B:
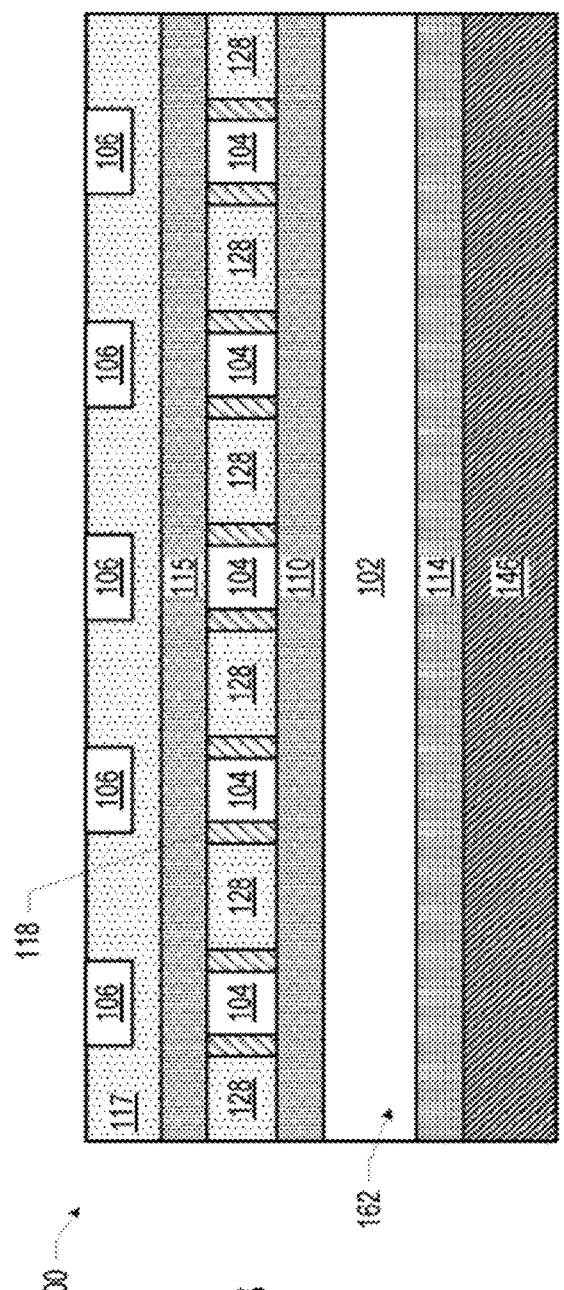
Figure 1C:
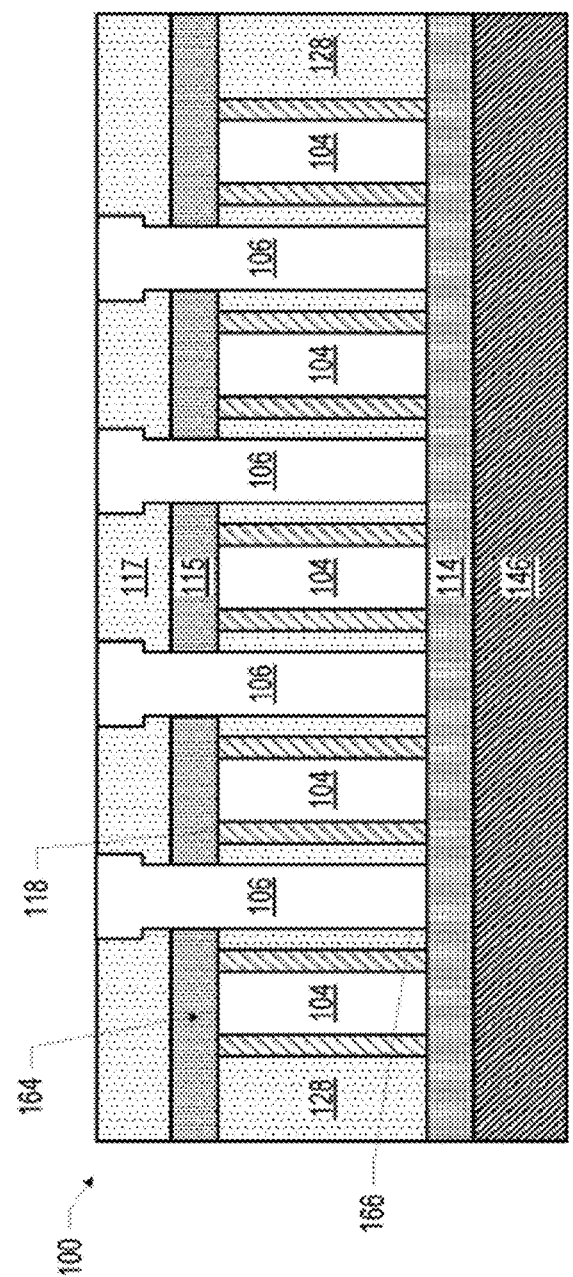

FIGS. 1A-1F are various views of a quantum dot device 100, which may be used with embodiments of the invention described below. FIG. 1A is a top view of a portion of the quantum dot device 100 with some of the materials removed so that the first gate lines 102, the second gate lines 104, and the third gate lines 106 are visible. Although many of the drawings and description herein may refer to a particular set of lines or gates as "barrier" or "quantum dot" lines or gates, respectively, this is simply for ease of discussion, and in other embodiments, the role of "barrier" and "quantum dot" lines and gates may be switched (e.g., barrier gates may instead act as quantum dot gates, and vice versa). FIGS. 1B-1F are side cross-sectional views of the quantum dot device 100 of FIG. 1A; in particular, FIG. 1B is a view through the section B-B of FIG. 1A, FIG. 1C is a view through the section C-C of FIG. 1A, FIG. 1D is a view through the section D-D of FIG. 1A, FIG. 1E is a view through the section E-E of FIG. 1A, and FIG. 1F is a view through the section F-F of FIG. 1A.

The quantum dot device 100 of FIG. 1 may be operated in any of a number of ways. For example, in some embodiments, electrical signals such as voltages, currents, radio frequency (RF), and/or microwave signals, may be provided to one or more first gate line 102, second gate line 104, and/or third gate line 106 to cause a quantum dot (e.g., an electron spin-based quantum dot or a hole spin-based quantum dot) to form in a quantum well stack 146 under a third gate 166 of a third gate line 106. Electrical signals provided to a third gate line 106 may control the electrical potential of a quantum well under the third gates 166 of that third gate line 106, while electrical signals provided to a first gate line 102 (and/or a second gate line 104) may control the potential energy barrier under the first gates 162 of that first gate line 102 (and/or the second gates 164 of that second gate line 104) between adjacent quantum wells. Quantum interactions between quantum dots in different quantum wells in the quantum well stack 146 (e.g., under different quantum dot gates) may be controlled in part by the potential energy barrier provided by the barrier potentials imposed between them (e.g., by intervening barrier gates).

Generally, the quantum dot devices 100 disclosed herein may further include a source of magnetic fields (not shown) that may be used to create an energy difference in the states of a quantum dot (e.g., the spin states of an electron spin-based quantum dot) that are normally degenerate, and the states of the quantum dots (e.g., the spin states) may be manipulated by applying electromagnetic energy to the gates lines to create quantum bits capable of computation. The source of magnetic fields may be one or more magnet lines, as discussed below. Thus, the quantum dot devices 100 disclosed herein may, through controlled application of electromagnetic energy, be able to manipulate the position, number, and quantum state (e.g., spin) of quantum dots in the quantum well stack 146.

In the quantum dot device 100 of FIG. 1, a gate dielectric 114 may be disposed on a quantum well stack 146. A quantum well stack 146 may include at least one quantum well layer 152 (not shown in FIG. 1) in which quantum dots may be localized during operation of the quantum dot device 100. The gate dielectric 114 may be any suitable material, such as a high-k material. Multiple parallel first gate lines 102 may be disposed on the gate dielectric 114, and spacer material 118 may be disposed on side faces of the first gate lines 102. In some embodiments, a patterned hardmask 110 may be disposed on the first gate lines 102 (with the pattern corresponding to the pattern of the first gate lines 102), and the spacer material 118 may extend up the sides of the hardmask 110, as shown. The first gate lines 102 may each be a first gate 162. Different ones of the first gate lines 102 may be electrically controlled in any desired combination (e.g., each first gate line 102 may be separately electrically controlled, or some or all the first gate lines 102 may be shorted together in one or more groups, as desired).

Multiple parallel second gate lines 104 may be disposed over and between the first gate lines 102. As illustrated in FIG. 1, the second gate lines 104 may be arranged perpendicular to the first gate lines 102. The second gate lines 104 may extend over the hardmask 110, and may include second gates 164 that extend down toward the quantum well stack 146 and contact the gate dielectric 114 between adjacent ones of the first gate lines 102, as illustrated in FIG. 1D. In some embodiments, the second gates 164 may fill the area between adjacent ones of the first gate lines 102/spacer material 118 structures; in other embodiments, an insulating material (not shown) may be present between the first gate lines 102/spacer material 118 structures and the proximate second gates 164. In some embodiments, spacer material 118 may be disposed on side faces of the second gate lines 104; in other embodiments, no spacer material 118 may be disposed on side faces of the second gate lines 104. In some embodiments, a hardmask 115 may be disposed above the second gate lines 104. Multiple ones of the second gates 164 of a second gate line 104 are electrically continuous (due to the shared conductive material of the second gate line 104 over the hardmask 110). Different ones of the second gate lines 104 may be electrically controlled in any desired combination (e.g., each second gate line 104 may be separately electrically controlled, or some or all the second gate lines 104 may be shorted together in one or more groups, as desired). Together, the first gate lines 102 and the second gate lines 104 may form a grid, as depicted in FIG. 1.

Multiple parallel third gate lines 106 may be disposed over and between the first gate lines 102 and the second gate lines 104. As illustrated in FIG. 1, the third gate lines 106 may be arranged diagonal to the first gate lines 102, and diagonal to the second gate lines 104. In particular, the third gate lines 106 may be arranged diagonally over the openings in the grid formed by the first gate lines 102 and the second gate lines 104. The third gate lines 106 may include third gates 166 that extend down to the gate dielectric 114 in the openings in the grid formed by the first gate lines 102 and the second gate lines 104; thus, each third gate 166 may be bordered by two different first gate lines 102 and two different second gate lines 104. In some embodiments, the third gates 166 may be bordered by insulating material 128; in other embodiments, the third gates 166 may fill the openings in the grid (e.g., contacting the spacer material 118 disposed on side faces of the adjacent first gate lines 102 and the second gate lines 104, not shown). Additional insulating material 117 may be disposed on and/or around the third gate lines 106. Multiple ones of the third gates 166 of a third gate line 106 are electrically continuous (due to the shared conductive material of the third gate line 106 over the first gate lines 102 and the second gate lines 104). Different ones of the third gate lines 106 may be electrically controlled in any desired combination (e.g., each third gate line 106 may be separately electrically controlled, or some or all the third gate lines 106 may be shorted together in one or more groups, as desired).

Although FIGS. 1A-F illustrate a particular number of first gate lines 102, second gate lines 104, and third gate lines 106, this is simply for illustrative purposes, and any number of first gate lines 102, second gate lines 104, and third gate lines 106 may be included in a quantum dot device 100. Other examples of arrangements of first gate lines 102, second gate lines 104, and third gate lines 106 are possible. Electrical interconnects (e.g., vias and conductive lines) may contact the first gate lines 102, second gate lines 104, and third gate lines 106 in any desired manner.

Not illustrated in FIG. 1 are accumulation regions that may be electrically coupled to the quantum well layer of the quantum well stack 146 (e.g., laterally proximate to the quantum well layer). The accumulation regions may be spaced apart from the gate lines by a thin layer of an intervening dielectric material. The accumulation regions may be regions in which carriers accumulate (e.g., due to doping, or due to the presence of large electrodes that pull carriers into the quantum well layer), and may serve as reservoirs of carriers that can be selectively drawn into the areas of the quantum well layer under the third gates 166 (e.g., by controlling the voltages on the quantum dot gates, the first gates 162, and the second gates 164) to form carrier-based quantum dots (e.g., electron or hole quantum dots, including a single charge carrier, multiple charge carriers, or no charge carriers). In other embodiments, a quantum dot device 100 may not include lateral accumulation regions, but may instead include doped layers within the quantum well stack 146. These doped layers may provide the carriers to the quantum well layer. Any combination of accumulation regions (e.g., doped or non-doped) or doped layers in a quantum well stack 146 may be used in any of the embodiments of the quantum dot devices 100 disclosed herein.

Apparatus and Method for a Hybrid Classical Quantum Computer

After Richard Feynman asked in 1982 whether quantum physics could be simulated efficiently using a quantum computer, much effort researching for a quantum computer has been focused on its universality and its efficiency over classical computation. One such example is David Deutsch's quantum Turing machine in 1985 that can be programmed to perform any computational task that can be performed by any physical object.

In contrast to theories and algorithms, quantum physical machines are in still their infancy. Efforts to build quantum information processing systems have resulted in modest success to date. Small quantum computers, capable of performing a small set of quantum operations on a very few qubits, represent the state of the art in quantum computation. In addition, quantum states are fragile in the sense that quantum states only remain coherent for a limited duration. This gap between algorithms and physical machines has driven the effort to invent hybrid classical-quantum algorithms. Some recent quantum algorithm developments have focused on short-depth quantum circuits to carry out quantum computations formed as subroutines embedded in a larger classical optimization loop, such as the variational eigensolver (P. J. J. O'Malley, 2016). Quantum languages, tools, and flows have been developed, providing software layers/stacks to translate and optimize applications to the quantum physical layer to cope with the stringent resource constraints in quantum computing (Frederic T. Chong, 2017, 14 Sep.).

On the hardware side, classical computers have been used to perform error correction for quantum computations. The "quantum co-processor" model is the most favorable prevailing execution model where a classical CPU controls a quantum processing unit in a similar manner to how CPUs in modern computer systems interact with GPUs. As described in (X.Fu, 2016, May) and (X. Fu, 2018), the microarchitecture for experimental superconducting quantum co-processors included features such as an arbiter on the code fetch data path to steer classical instruction to host CPU and quantum instruction to quantum co-processor, an exchange register file to synchronize register files between host CPU and the quantum co-processor, and a quantum instruction cache.

The microarchitectures for these mechanisms, however, are not well defined and explicit support for hybrid classical-quantum programs is lacking. Consequently, it is unclear how a quantum co-processor would be implemented within a quantum computer, particularly one which is required to run a diverse set of quantum programs. A flexible and programmable model has yet to be developed for executing hybrid classical-quantum algorithms.

One embodiment of the invention adds a set of quantum instructions to an instruction set architecture (ISA) of a processor such as a CPU. By way of example, these instructions may be included in an extension to the ISA (e.g., such as the AVX-512 extensions for the x86 platform). In addition, in one embodiment, a quantum engine is added to the processor's execution unit and the new quantum instructions are fetched, decoded, scheduled, and executed on the functional units of the quantum engine. In one embodiment, the quantum engine interacts with the classical execution engines using a shared register file and/or system memory. Upon executing the quantum instructions (or quantum cops in certain embodiments described herein), the quantum execution engine generates control signals to manipulate the state of the qubits within the quantum processor. The quantum engine also executes instructions to take a measurement of specified sets of qubits and store the results. In these embodiments, a quantum/classical interface provides connectivity between the quantum engine of the classical processor and the quantum processor.

Figure 2:
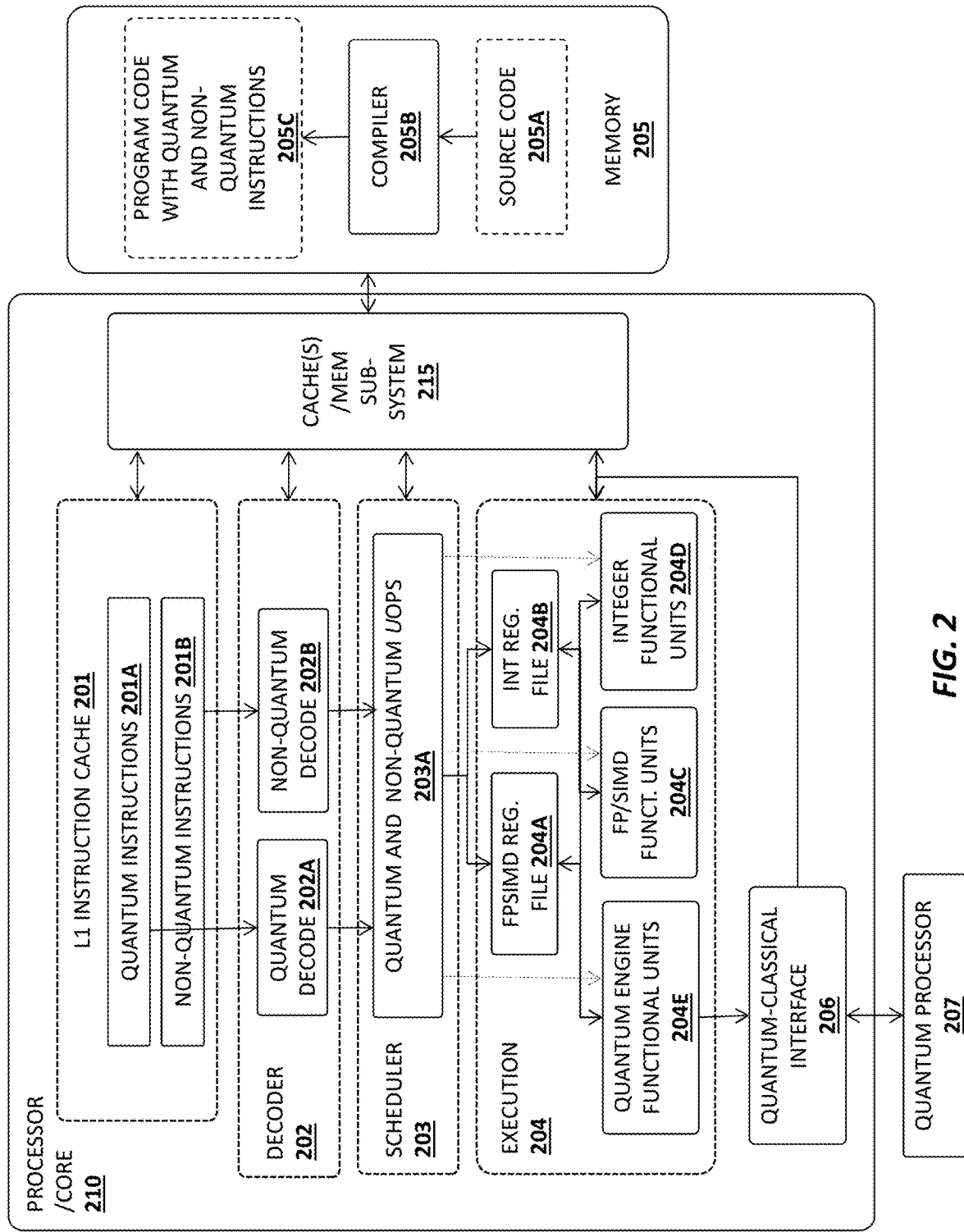
FIG. 2 illustrates one embodiment of a processor pipeline for processing quantum and non-quantum instructions.

FIG. 2 illustrates one embodiment of a processor or core 210 which fetches, decodes, and executes quantum instructions 201A and non-quantum instructions 201B, utilizing the same pipeline resources as the non-quantum instructions 201B. The processor/core 210 of this embodiment supports quantum extensions to an existing ISA of the processor/core 210 (e.g., extending the ISA to include the quantum instructions 201A). Program code 205C comprising the quantum and non-quantum instructions is generated by a compiler 205B from source code 205A written by a programmer (e.g., utilizing the extended ISA). Various source/program code examples are provided below.

Quantum and non-quantum instructions 201A-B are fetched from memory 205 at the front end of the instruction pipeline and stored in a Level 1 (L1) instruction cache 201. Instructions and data may also be stored within a Level 2 or Level 3 cache within a cache/memory subsystem 215, which manages memory requests and cache coherency.

A decoder 202 decodes the instructions 201A-B into microoperations or uops 203A which are scheduled for execution by a scheduler 203 and executed by execution circuitry 204. In one embodiment, certain stages of the pipeline are enhanced to include hardware support for processing the quantum instructions 201B while other stages are unaltered. For example, quantum decode circuitry 202A may be added to the decoder 202 for decoding the quantum instructions 201A, just as non-quantum decode circuitry 202B decodes non-quantum instructions 201B. Although illustrated as separate components in FIG. 2 for the purpose of explanation, the quantum decode circuitry 202A and non-quantum decode circuitry 202B may comprise a common or overlapping set of circuitry and/or microcode. For example, in one embodiment, an existing decoder may be extended to include microcode support for quantum instructions (e.g., in microcode ROM) to generate new sets of quantum uops. The decoder 202 includes other decode circuitry such as a set of decode table structures (see, e.g., FIG. 3 and associated text), depending on the processor architecture.

In one embodiment, the decoder 202 generates a sequence of uops 203A in response to decoding the instructions 201A-B. In an implementation with quantum and non-quantum instructions, the uops may include a mixture of quantum uops and non-quantum uops, which are then scheduled for execution by an instruction scheduler 203.

The quantum and non-quantum uops 203A generated by the decoder 202 may initially be queued for execution within one or more uop queues of the scheduler 203, which dispatches the uops from the uop queue(s) in accordance with dependencies and/or execution resource availability. The embodiments of the invention may be implemented on various different types of processors with different types of schedulers. For example, in one embodiment, a set of execution "ports" couple the scheduler 203 to the execution circuitry 204, where each execution port is capable of issuing uops to a particular set of functional units 204C-E. In the example architecture shown in FIG. 2, for example, SIMD and floating point (FP) uops may be issued by the scheduler 203 over a FP/SIMD execution port coupled to a set of FP/SIMD functional units 204C and integer uops may be issued over an integer port coupled to a set of integer functional units 204D. While only two types of non-quantum functional units are shown for simplicity, the processor/core 210 may include various other/additional non-quantum functional units (e.g., such as load/store address generation units, branch units, additional SIMD and integer units, etc).

In the particular embodiment shown in FIG. 2, the quantum engine functional units 204E share the same set of register files 204A-B used by the legacy processor functional units 204C-D. In this particular example, the register files 204A-B include a FP/SIMD register file 204A which stores floating point and SIMD operands used by the FP/SIMD functional units 204C and an integer register file 204B which stores integer operands for the integer functional units 204D. In one implementation, the FP/SIMD register file 204A comprises 512 bit vector registers and the integer register file 204B comprises 64-bit scalar registers. Of course, different processor architectures will use different types of registers shared by the quantum engine functional units 204E. Various other types of registers may also be used such as a set of control/status registers and mask registers.

In an embodiment in which quantum uops are mixed with non-quantum uops, the quantum uops are issued over one or more quantum ports to a set of quantum engine functional units 204E, which execute the quantum uops to perform the underlying quantum operations. For example, the quantum engine functional units 204E, in response to the quantum uops, may generate control signals over a quantum-classical interface 206 to manipulate and take measurements of the qubits of a quantum processor 207.

The quantum-classical interface 206 includes digital-to-analog (D-A) circuitry to convert the digital quantum control signals generated by the quantum engine functional units 204E to analog signals required to control the quantum processor 207 (e.g., such as the codeword triggered pulse generation (CTPG) units and Arbitrary Waveform Generator (AWG) described below) and also includes analog-to-digital (A-D) circuitry to convert the physical qubit measurements to digital result data.

In one embodiment, the quantum-classical interface 206 is integrated on the same semiconductor chip as the other components of the instruction processing pipeline (e.g., the execution circuitry 204, scheduler 203, decoder 202, etc). As discussed in detail below, different types of circuit/logic components may be used depending on the particular physical implementation of the quantum processor 207.

Figure 3:
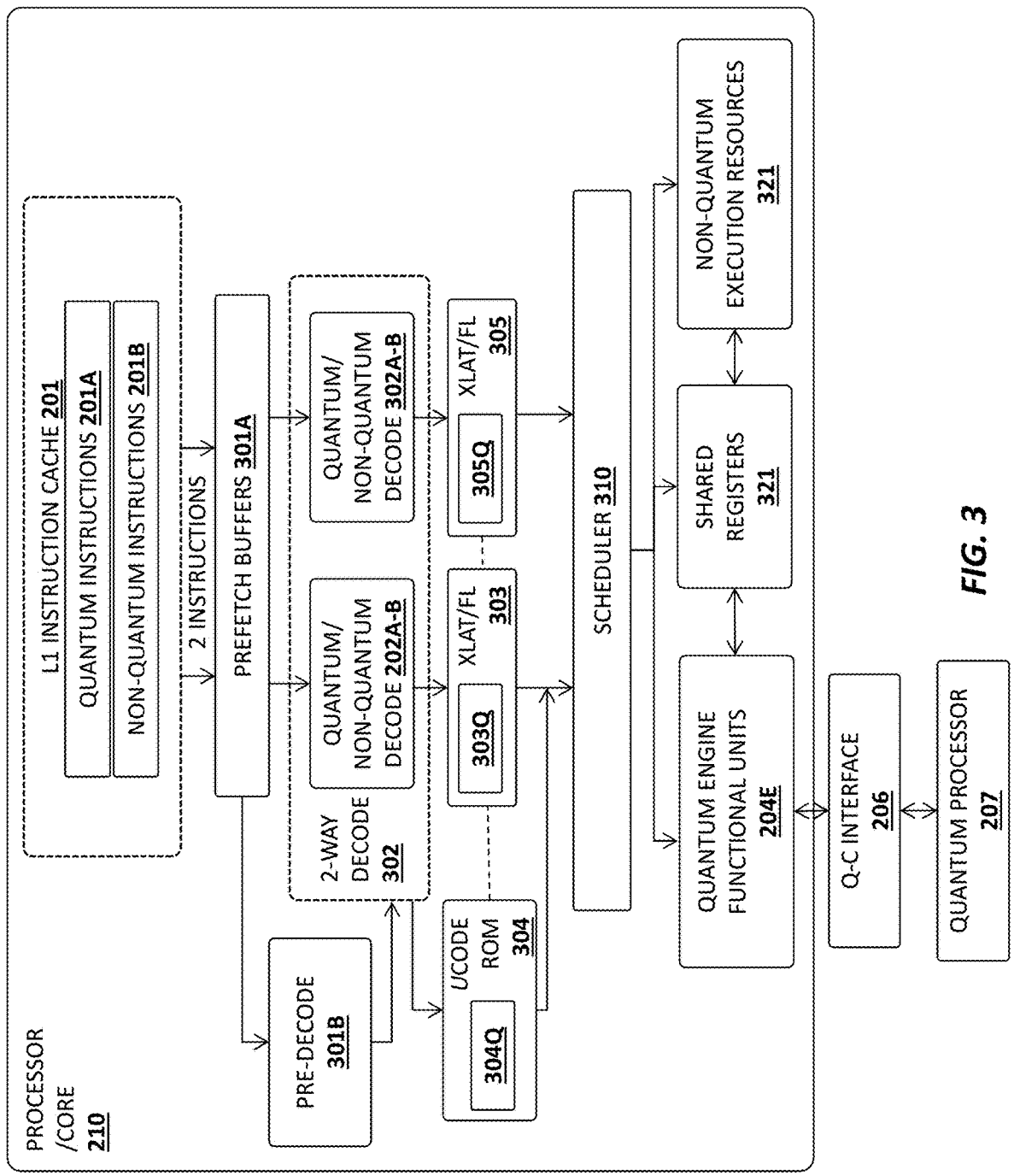
FIG. 3 illustrates an embodiment of front-end circuitry of a processor for processing quantum and non-quantum instructions.

FIG. 3 illustrates one embodiment in which quantum instruction processing support is added to a low power processing pipeline including a pre-decode buffer 301B, a 2-way decoder 302 with dual sets of quantum/non-quantum decoder circuitry 202A-B, 302A-B, dual lookup tables for instruction translation (XLAT), and a ucode ROM 304. In one embodiment, the XLAT components 303, 305 and ucode ROM 304 are extended to support the quantum instructions, as indicated by logic blocks 303Q-305Q. The pre-decode buffer 301B detects and marks macro-instruction boundaries prior to full decoding into uops by the 2-way decoder 302.

The operands for the quantum and non-quantum uops are stored in a set of shared registers 321 (as described above) and accessed by the quantum functional units 320 when executing the uops. The Q-C interface 320, in response to the quantum uops, controls the operation of the quantum processor 207.

Figure 4:
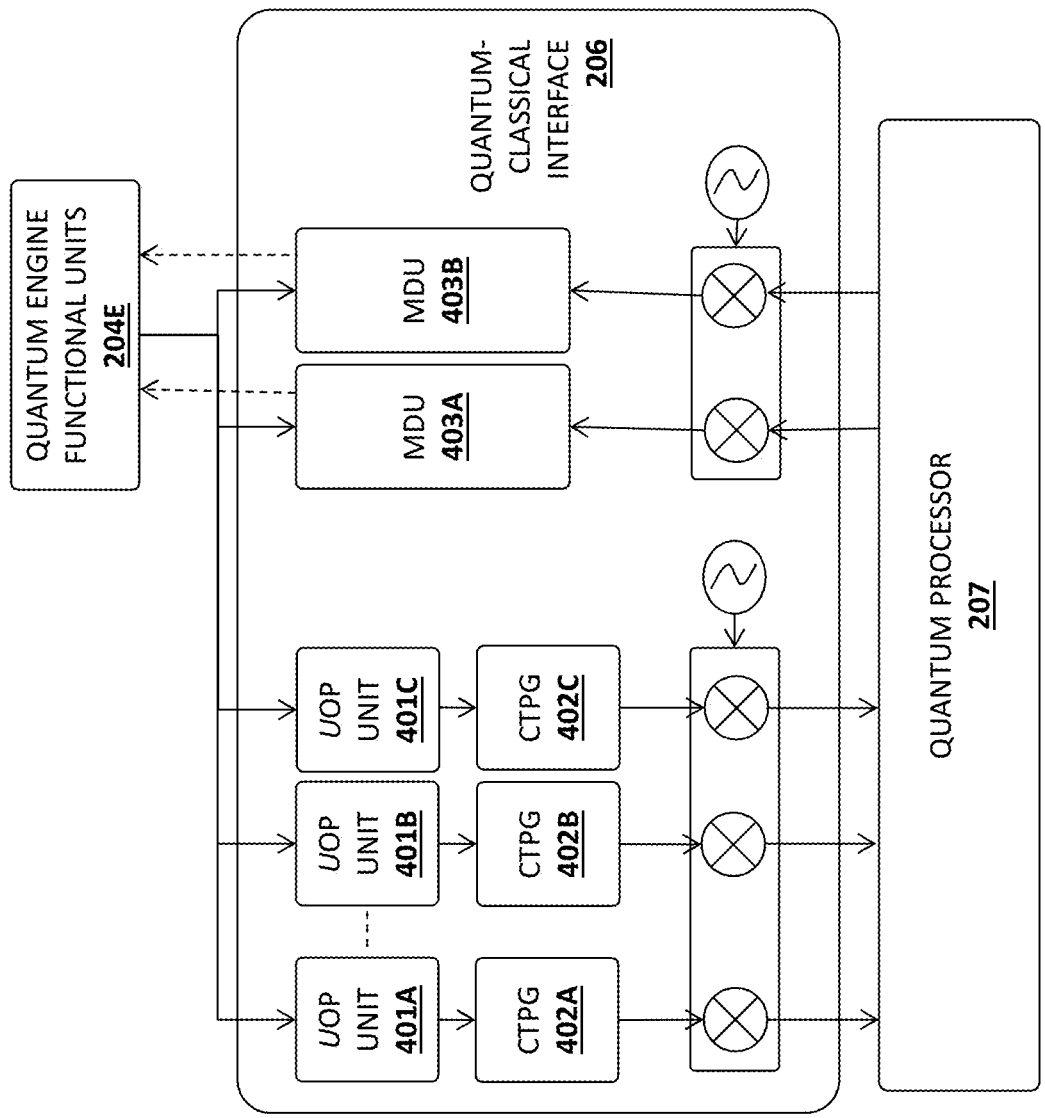
FIG. 4 illustrate embodiments of a quantum-classical processor interface.
Figure 5:
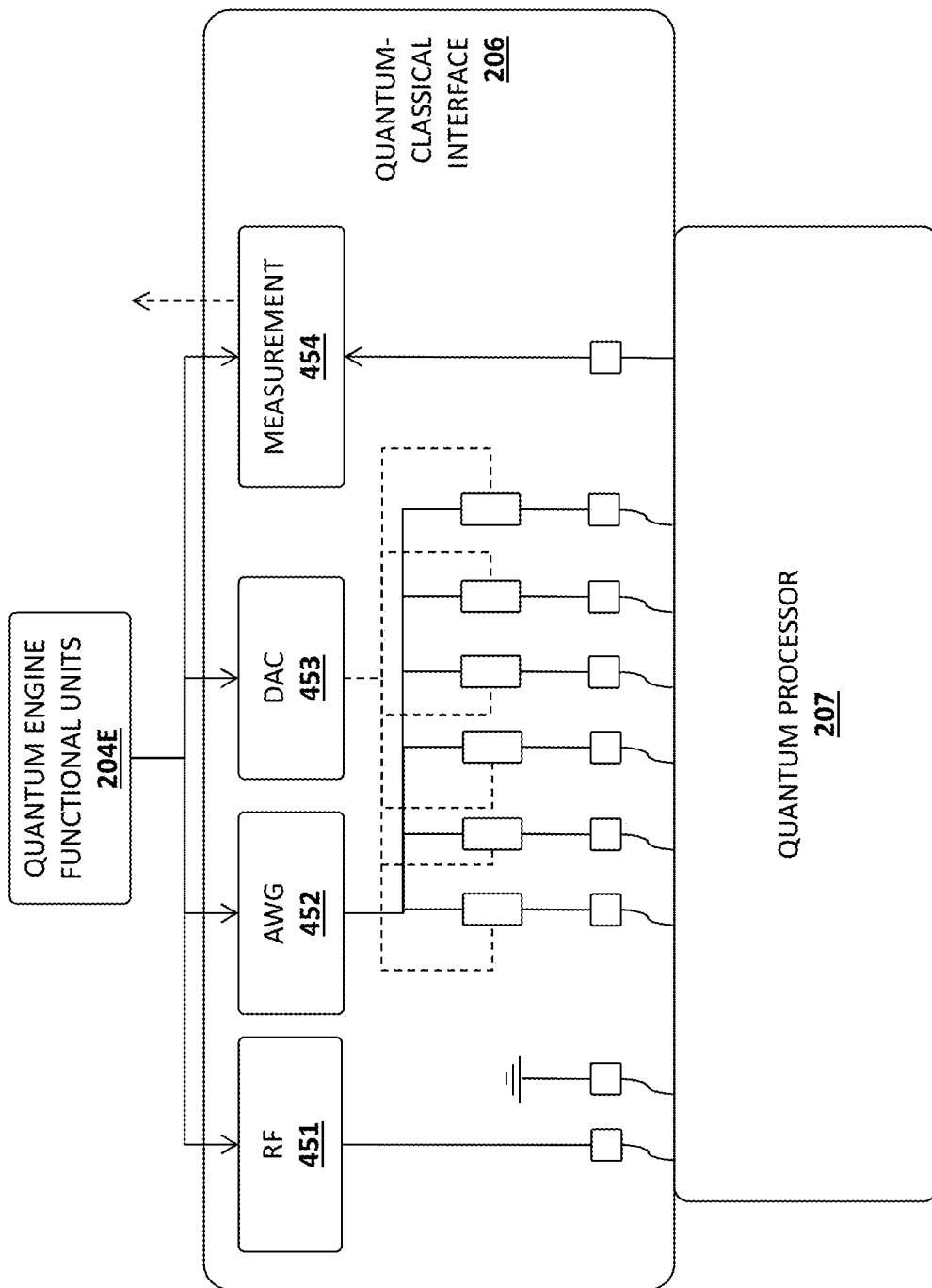
FIG. 5 illustrates an example of a quantum computing system.

Different examples of a quantum-classical interface 206 are illustrated in FIGS. 4-5. The Q-C interface 206 in FIG. 4 includes a plurality of uop units 401A-C which, responsive to the uops executed by the quantum engine functional units 204E, generate codewords to control operation of a plurality of codeword triggered pulse generation (CTPG) units 402A-C. In response, the CTPG units 402A-C generate sequences of pulses to control the qubits of the quantum processor 207. Once the quantum processor 207 has reached a specified execution state, quantum measurements are taken by one or more of the measurement discrimination units (MDUs) 403A-B.

The Q-C interface 206 shown in FIG. 5 includes a set of components to perform microwave complex signal generation including an RF microwave unit 451, a multi-channel Arbitrary Waveform Generators (AWG) 452, one or more digital to analog converters (DACs) 453 and one or more measurement units 454. In one embodiment, the input to each of these components comprises a set of codewords generated by the quantum engine functional units 204E and the output is an analog waveform which manipulates the state of the qubits of the quantum processor 207. The measurement units 454 measure a current state associated with one or more qubits at a designated point in execution.

Processor and Instruction Set for Flexible Qubit Control with Low Memory Overhead Qubits are generally controlled through the application of RF or DC pulses generated based on waveforms. State-of-the art qubit control relies on generating and then storing waveforms in the memory of an arbitrary waveform generator (AWG); the waveform generator is triggered at given time to control qubits with a selected waveform. However, this approach introduces many constraints at many levels of the control system.

For example, waveforms have significant memory requirements which increases with the number of supported quantum operations. In addition, increasing the sampling rate (e.g., when targeting higher frequencies or shorter pulses) results in increasing the overall number of discrete samples of the waveform and thus more memory. Similarly, support for arbitrary qubit rotations with fine angle resolution involves storage of a very large number of waveforms. Finally, while certain control pulses have a short duration, other pulses such as gate control pulses in silicon-spin qubits have significantly longer durations, resulting in high memory requirements for storing longer waveforms.

Quantum compiler efficiency of current qubit control implementations is also severely limited. In particular, memory constraints limit the number of available operations and thus the capacity of the compiler to synthetize efficient circuits by fusing operations. For example, two successive qubit rotations with an angle α and β requiring an execution time t could be replaced by a single rotation θ=α+β which requires only and takes advantage of the coherence time of the qubit. If a rotation of angle θ is not available (due to memory resource limitations or unknown angle at compile-time), this optimization become impossible. Waveform uploading time can also be significant and requires extra software to drive the waveform generator and manage the waveform storage.

Current implementations also do not allow efficient calibration and qubit tuning since these routines involve sweeping over the different parameters of the waveform such as frequency, phase or amplitude resulting in a very large number of waveforms. In addition, due to limited memory resources, calibration routines may be slowed down by uploading the waveform partially at each step.

Furthermore, triggering commercial arbitrary waveform generators involves a high latency preceding the pulse generation (due to logic propagation delays and waveform samples being fetched from memory). In certain quantum circuits requiring fast feedback control such as error correction circuits and active qubit reset (pairs of measurements and binary-controlled pauli-X gate to reset the qubit to the ground state), slow feedback due to high latency results in inefficient control.

Various scalability and cost issues also exist with existing implementations. For example, when increasing the number of qubits and control lines, more arbitrary waveform generators with more SRAM memories are required. Whether the AWGs are custom chips or stand-alone instruments, the cost may become prohibitive. Scaling up the system and increasing the amount of memory and channels will result in increasing the physical space required in the case of chips, or physical space in the lab when using instruments. In addition, more waveform generators with more memory results in increasing energy consumption.

The embodiments of the invention described below include a microcode unit which uses a new set of microinstruction to dynamically synthetize waveforms, alleviating current waveform storage requirements. Besides the reduced memory overhead, this approach offers the flexibility of generating arbitrary pulses to implement arbitrary quantum operations, enables advanced compiler optimization techniques, allows dynamic waveform synthesis when executing code, removes waveform uploading overhead, provides improved scalability, promotes system integration at lower temperatures, and reduces implementation and production costs.

One embodiment of the invention includes a direct digital synthesis (DSS) core block which translates a new set of instructions or microoperations (uops) into pulses used to control qubits of a quantum processor. The new instruction set encodes all the information required by the DDS core block to synthetize the desired waveforms (pulses), so no memory is consumed storing waveform samples.

Figure 6:
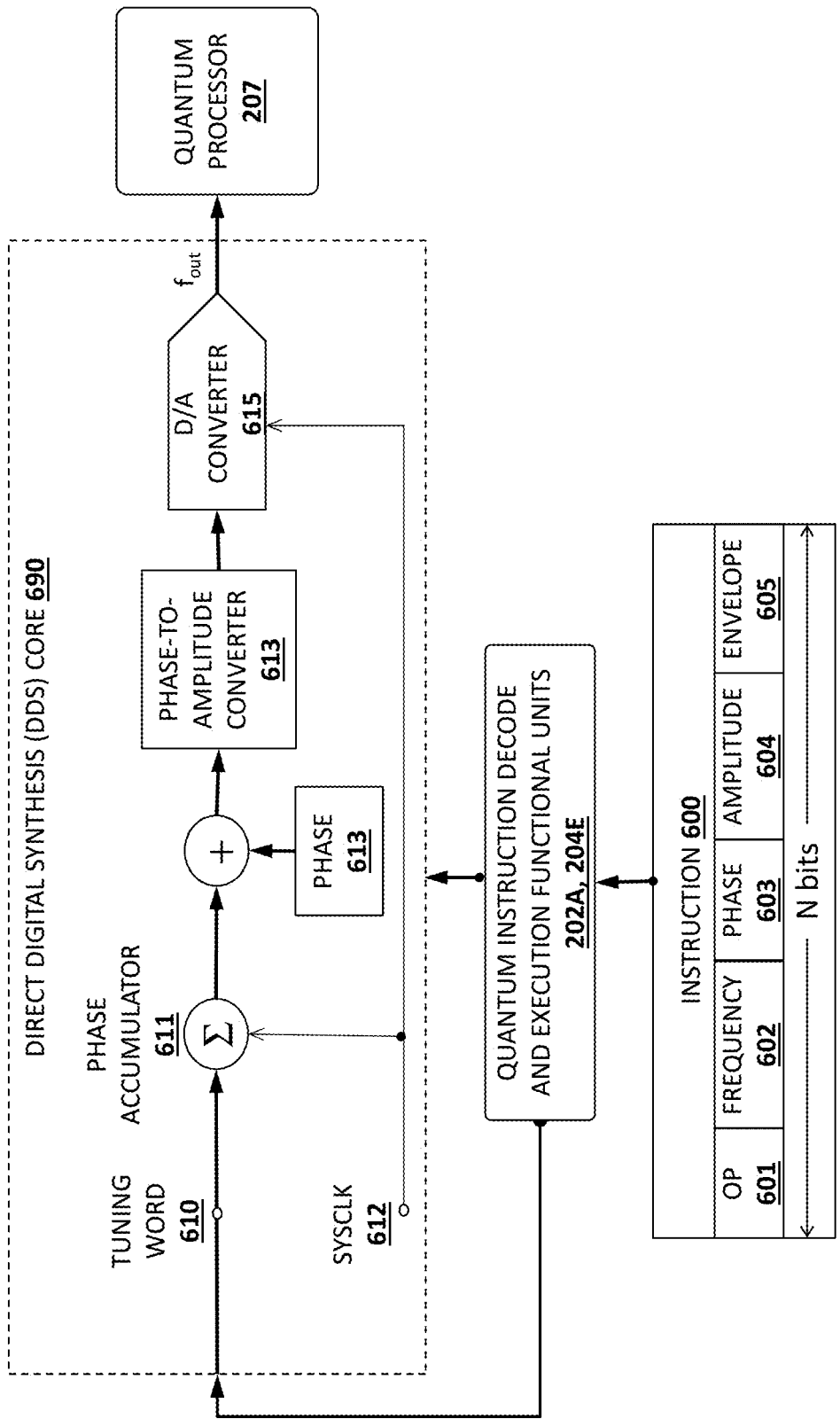
FIG. 6 illustrates one embodiment of a direct digital synthesis (DDS) core.

FIG. 6 illustrates one particular embodiment including a quantum instruction format 600 specifying quantum operations which are implemented by a DSS core 690. In particular, in one embodiment, the DSS core 690, in response to the quantum instruction 600, synthesizes waveforms based on the opcode, operands, and/or other fields of the instruction 600. The illustrated quantum instruction 600 includes an opcode 601 specifying the operation to be performed and may also identify one or more qubits to be controlled by the operation. In other embodiments, the qubits may be identified via a separate operand field or immediate of the instruction 600.

A frequency field 602 provides a tuning word value 610 which is input to phase accumulator 611 along with a system clock 612. The turning word 610 sets the sample count rate for the accumulator, thereby adjusting the frequency of the signal being synthesized. The value at the output of the accumulator represents the phase of the signal versus time and may be adjusted by a phase offset value 613 stored in a register, cache, or memory location. In one embodiment, the phase offset value 613 is read or derived from the phase field 603 of the instruction 600.

The adjusted phase value is then used as an index to a phase-to-amplitude converter 613, which outputs a sample having a specified amplitude value based on the input phase value. A digital-to-analog (D/A) converter 615 receives the stream of digital samples generated in this manner and responsively produces an analog output signal (font) to control the qubits of the quantum processor 207.

One embodiment of the instruction 600 also includes an amplitude field 604 specifying an amplitude offset which may be added to the amplitude value output by the phase-to-amplitude converter 613 and the envelope field 605 specifies an envelope for shaping the generated waveform. These fields are described in greater detail with respect to FIGS. 8-9.

In one embodiment, the quantum instructions are decoded by an instruction decoder 202A to generate sequences of quantum microoperations which are then executed by quantum execution functional units 204E to control the DDS core 690. Alternatively, the DDS core 690 may itself include the instruction decode and/or execution circuitry to decode and execute the quantum instructions 600. The underlying principles of the invention are not limited to any particular arrangement of the decode and execution circuitry.

In contrast to traditional codeword-based systems, the embodiment shown in FIG. 6 does not rely on waveforms stored in memory. Rather, the parameters of the pulses are encoded into the instruction 600 itself and used to synthetize the waveform in real-time using a Direct Digital Synthesis (DDS) core 690. Based on the values specified by the instruction 600, the DSS core 690 dynamically generates the waveforms, streaming samples to the DAC 615 to dynamically generate the analog waveforms. The microinstructions are decoded and executed to generate the pulses with cycle accurate timing. The generated DC/RF pulses act on the qubits and performs the desired quantum operation.

Figure 7:
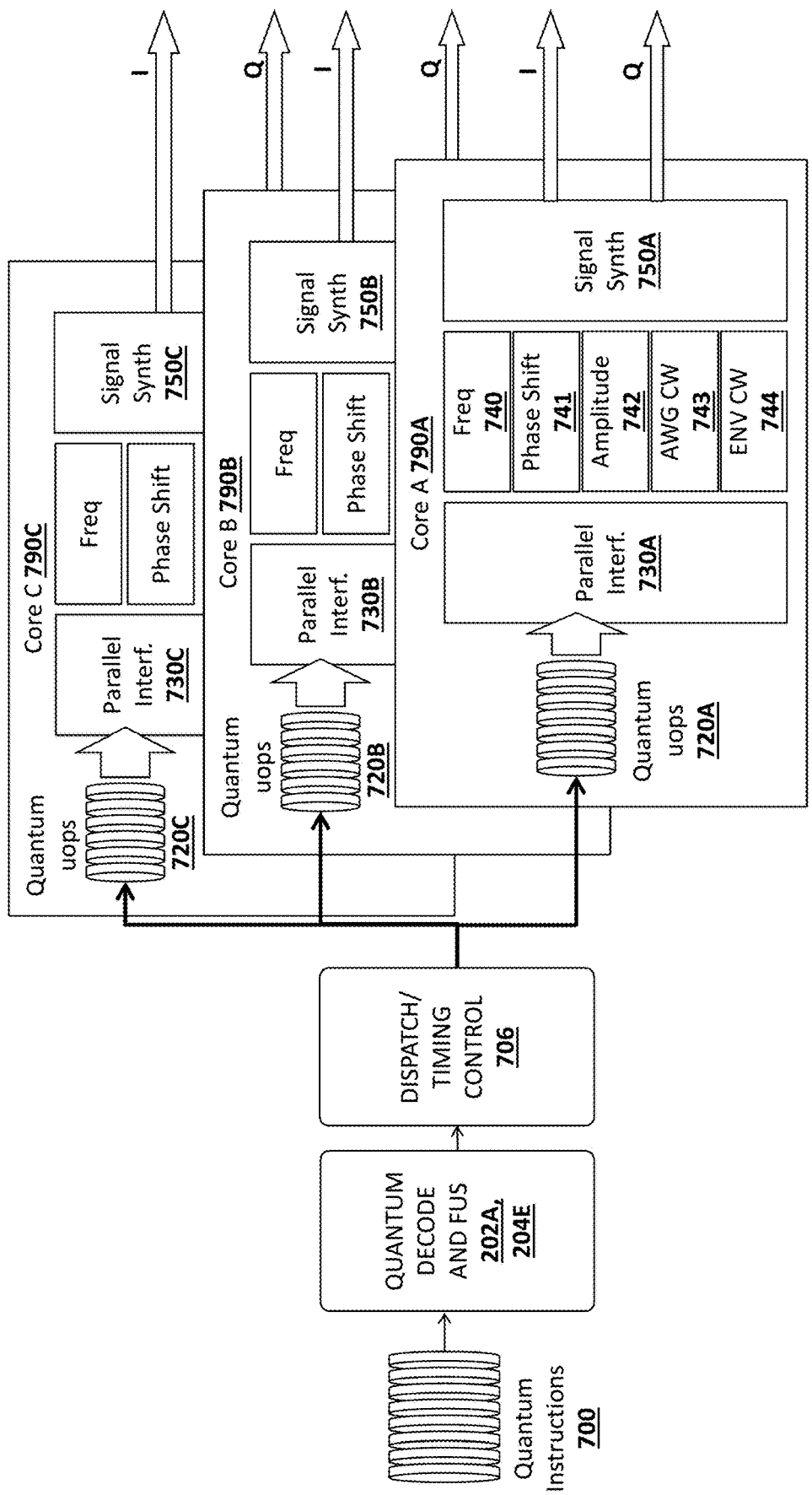
FIG. 7 illustrates an example set of cores for digitally synthesizing waves in response to instructions.

FIG. 7 illustrates an embodiment with three independently operable quantum cores 790A-C which perform quantum operations using the techniques described herein. In operation, quantum instructions 700 from multiple threads are decoded and (potentially partially) executed by quantum decode and execution functional units 202A, 204E. The resulting quantum microoperations are dispatched to the various cores 790A-C by dispatch/timing control circuitry 706. In one embodiment, the dispatch/timing control circuitry 706 distributes the quantum uops 720A-C to the different cores 790A-C based on uop data and/or resource dependencies. For example, to maximize parallelization, the dispatch/timing control circuitry 706 may maintain a first quantum operation on the same core as a second quantum operation which is dependent on the results of the first quantum operation. In contrast, quantum operations which are not dependent may be distributed to different cores, to allow for parallel execution.

In one embodiment, each core 790A-C includes a queue of dispatched quantum uops 720A-C. A parallel processing interface 730A-C may process at least some of these quantum operations in parallel based on the opcode and data fields of each quantum instruction 600. As described herein, a quantum instruction may include fields/opcodes to specify one or more of: a frequency 740, a phase shift value 741, an amplitude value 742, an arbitrary wave generator codeword 743, and an envelope codeword 744. One or more of these values are then used by signal synthesis circuitry 750A-C to generate the in phase (I) and quadrature (Q) signal components to manipulate one or more qubits. The signal synthesis circuitry 750A-C may include any type of circuitry for synthesizing a waveform using input parameters including, but not limited to, one or more of the components shown in FIG. 6.

Figure 8:
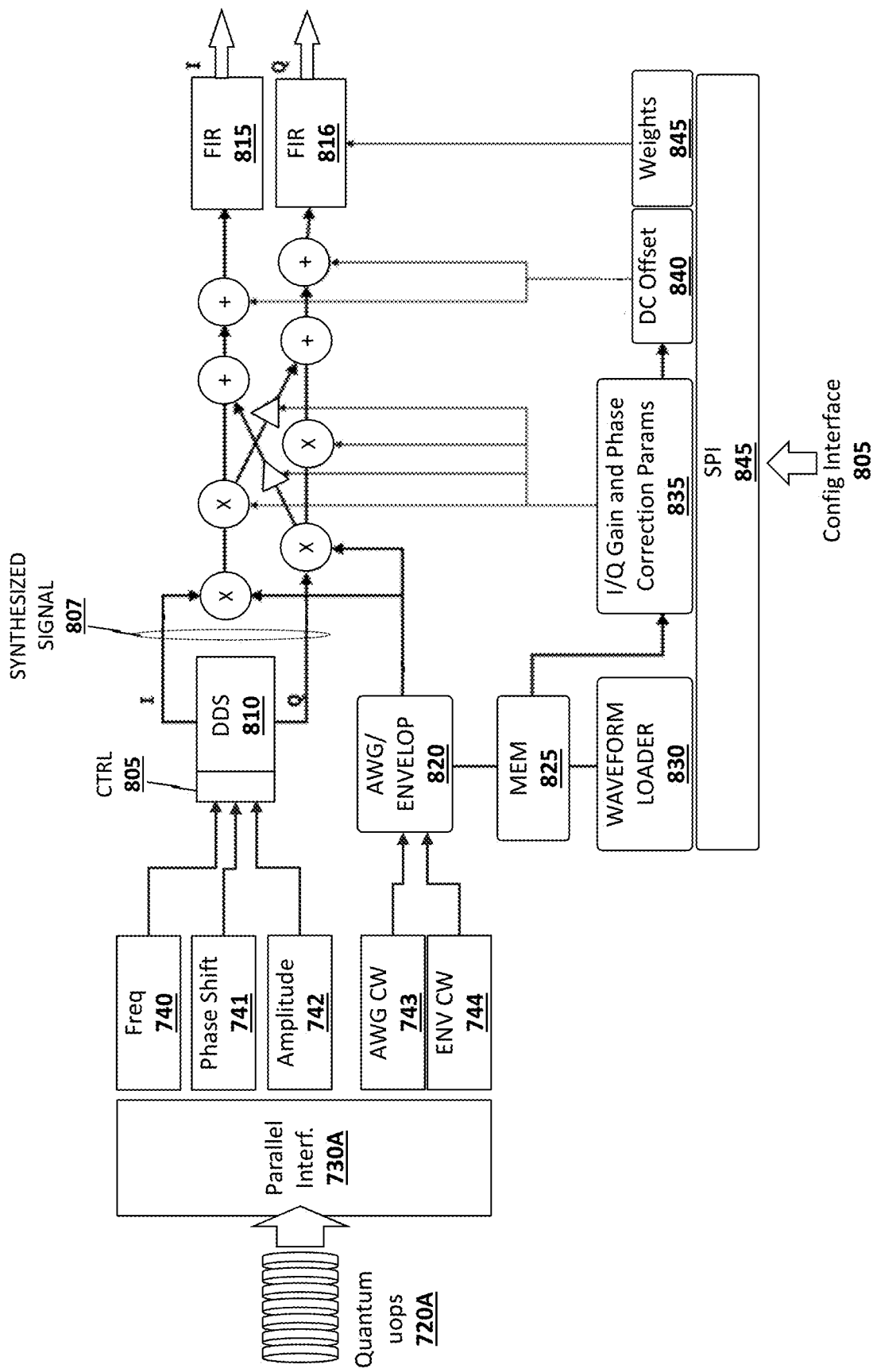
FIG. 8 illustrates additional details for one embodiment of a DSS core.

FIG. 8 illustrates additional details for one embodiment of a signal synthesis circuit 750A-C. One or more of the input values 740-744 may be specified directly or indirectly in a quantum instruction 600. For example, some values may be encoded directly within the instruction 600 (e.g., as immediate values) while other values may be specified via opcodes which map to registers or memory locations where the actual input values are stored (e.g., having been calculated by prior instructions and/or loaded from memory).

Regardless of how the values are retrieved, controller circuitry 805 of a direct digital synthesis (DDS) circuit 810 uses the frequency 740, phase shift 741, amplitude 742 and/or other values to synthesize a signal comprising in-phase (I) and quadrature (Q) components (e.g., two amplitude-modulated sinusoids that are offset in phase by one-quarter cycle).

In one implementation, an AWG/envelope generator 820 generates a waveform to shape the signal produced by the DDS 810. One or both the AWG codeword 743 and envelope codeword 744 may be used to specify the shape of the envelope to be applied. The envelope signal is then generated by the AWG/envelope generator 820 and mixed with the synthesized signal 807.

Figure 9:
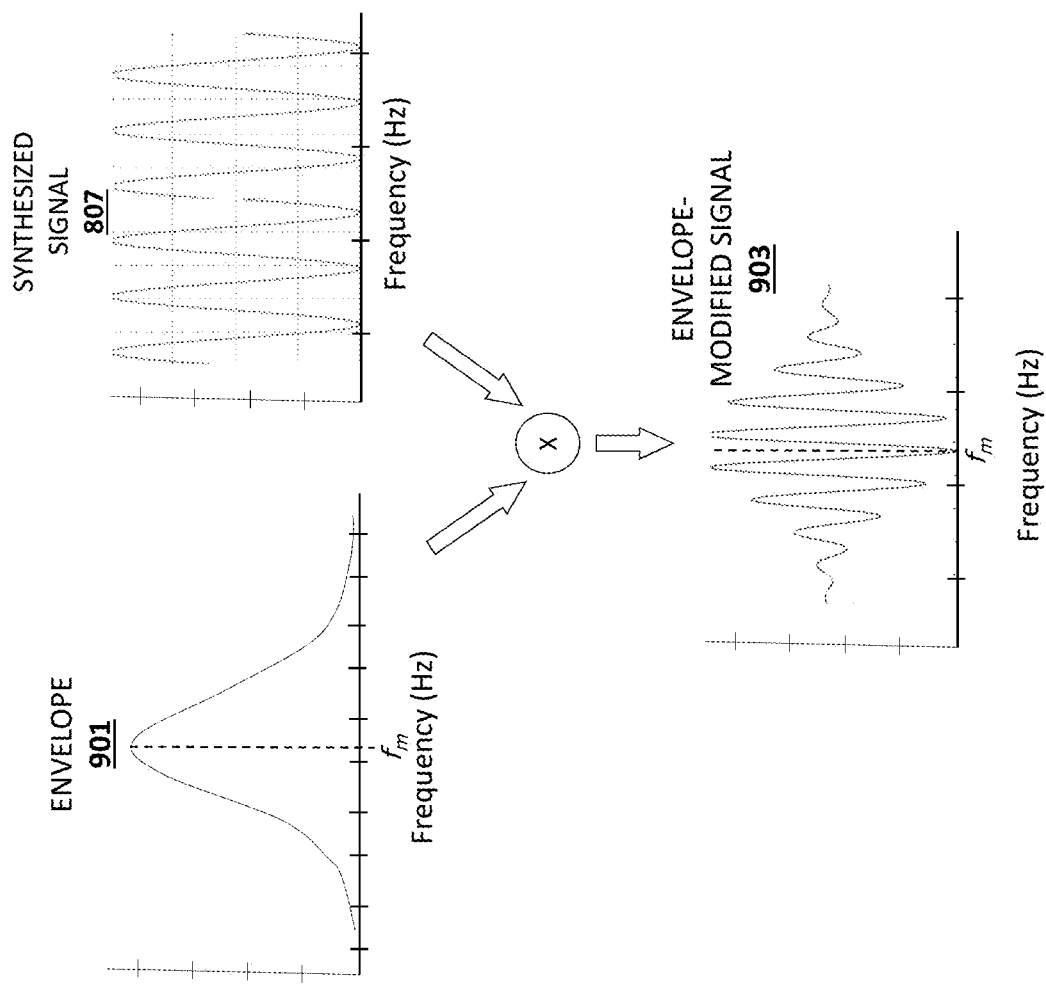
FIG. 9 illustrates an envelope being applied to a synthesized signal.

For example, FIG. 9 illustrates an example envelope 901 which may be specified by the AWG and/or envelope codewords 743-744. In this case, the envelope 901 is a simple Gaussian distribution where the median frequency $f_m$ is the highest frequency value with downward slopes to the right and left as illustrated. The envelope 901 is mixed with (e.g., multiplied by) the synthesized signal 807 (shown merely as a sine wave for simplicity) to produce an envelope-modified signal 903 (i.e., where amplitude drops on either side of $f_m$). In this manner, the pulse generated to control a qubit can be precisely shaped based on the characteristics of the target qubit and/or the overall quantum system to reduce interference with other qubits. Based on the system configuration, a waveform loader 830 may load different envelope waveforms into memory 825 from which they may be used by the AWG/envelope generation circuitry 820.

The resulting signal may be further processed to correct in-phase (I) and quadrature (Q) gain and phase imbalances introduced by imperfect electronics (e.g., such as the mixers). In one embodiment, I/Q gain and phase correction circuitry 835 is configured with specific parameters based on the current state of the system. Similarly, to correct for DC imbalances and to remove unwanted sideband tones, DC offset circuitry 840 may be programmed with a DC offset value for both the I and Q components of the signal (i.e., and added to the signals as illustrated). In one implementation, these correction parameters and other configuration settings are specified via a configuration interface 805 of a serial peripheral interface (SPI) bus 845 or other type of interconnect. However, the underlying principles of the invention are not limited to any particular type of interconnect or bus. In other embodiments, a high speed interconnect such as PCIe may be used.

In the illustrated embodiment, two finite impulse response (FIR) filters 815-816 remove unwanted tones/harmonics in the I and Q signal components based on coefficients or weights 845 which may be programmed and updated via the SPI interconnect 845. For example, the I and Q components may identify those frequencies within the signals that should be passed through the FIR filters 815-816 and those should be removed (e.g., set to 0 to reduce interference). As a result, the final I and Q signals can be specifically targeted to the frequency and phase required for the current qubit operation, without inadvertently affecting other qubits with unwanted frequency components.

Thus, the circuit shown in FIG. 8 is capable of performing signal synthesis for each specific qubit based on operations specified in a decoded microinstruction. These operations will synthesize the qubit control pulses based on the waveform parameters encoded in the instruction and the various correction parameters specified via a configuration interface 805. The parameters specified by the instruction and/or configuration interface may include the amplitude, phase, frequency and duration of the pulse. In addition, an envelope may be applied to shape the pulse as needed. The circuitry in FIG. 8 may be included in a set of Direct Digital Synthesis (DDS) cores (e.g., such as in the arrangement in FIG. 7) to generate per-channel signals with frequencies ranging from DC (0 Hz) to a configurable high frequency (the highest frequency bound is configurable and depends mainly on the speed of the used DAC). Each such channel may have its own microinstruction queue as shown in FIG. 7, from which microinstructions are executed according to the specified timing. Moreover, a configuration interface 805 allows configuration parameters to be applied and updated before execution to calibrate the signal path before use.

Table A below provides an example set of quantum instructions which may be executed by the embodiments of the invention to perform quantum operations. Note, however, that the underlying principles of the invention are not limited to any particular instruction format or set of instructions.

TABLE A

| Instruction | Description | Parameters |
|---|---|---|
| STA CH, A, T, ENV, E, COND | Set Amplitude of channel CH to A and switch on the channel for a duration T if E == 1 and COND == 1; use envelope ENV when issuing the pulse. | Channel, Amplitude, Duration, Envelop, Condition, On/Off |
| STF CH, F, T, ENV, E, COND | Set frequency of channel CH to F and switch on the channel for a duration T if E == 1 and COND == 1; use envelope ENV when issuing the pulse. | Channel, Frequency, Duration, Envelop, Condition, On/Off |
| STP CH, P, T, ENV, E, COND | Set phase offset of channel CH to P and switch on the channel for a duration T if E == 1 and COND == 1; use envelope ENV when issuing the pulse. | Channel, Phase, Duration, Envelop, Condition, On/Off |
| STAP CH, A, P, T, ENV, E, COND | Set Amplitude and Phase of channel CH to A and P and switch on the channel for a duration T if E == 1 and COND == 1; use envelope ENV when issuing the pulse. | Channel, Amplitude, Phase, Duration, Envelop, Condition, On/Off |
| STAF CH, A, F, T, ENV, E, COND | Set Amplitude and Frequency of channel CH to A and F and switch on the channel for a duration T if E == 1 and COND == 1; use envelope ENV when issuing the pulse. | Channel, Amplitude, Frequency, Duration, Envelop, Condition, On/Off |
| RDO CH, MR, T, COND | Readout Qubit on channel CH for a duration T, and save measurement outcome to register MR if COND == 1. | Channel, Measurement Register ID, Duration, Condition, On/Off |
| SYNC | Wait on Barrier for Channel Synchronization | None |

Figure 10A:
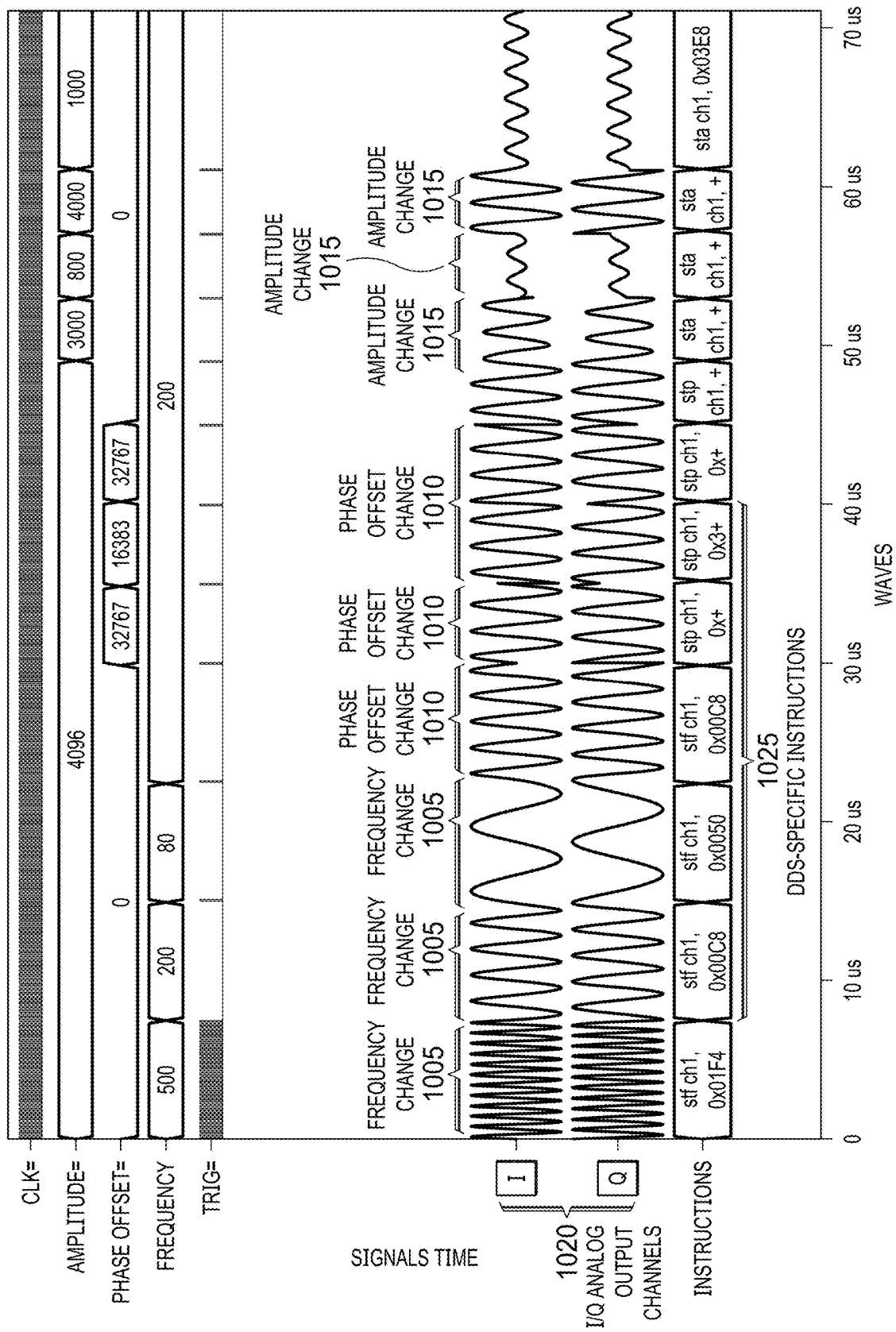
FIGS. 10A-B illustrate resulting waveforms generated by quantum instructions in accordance with the embodiments of the invention.
Figure 10B:
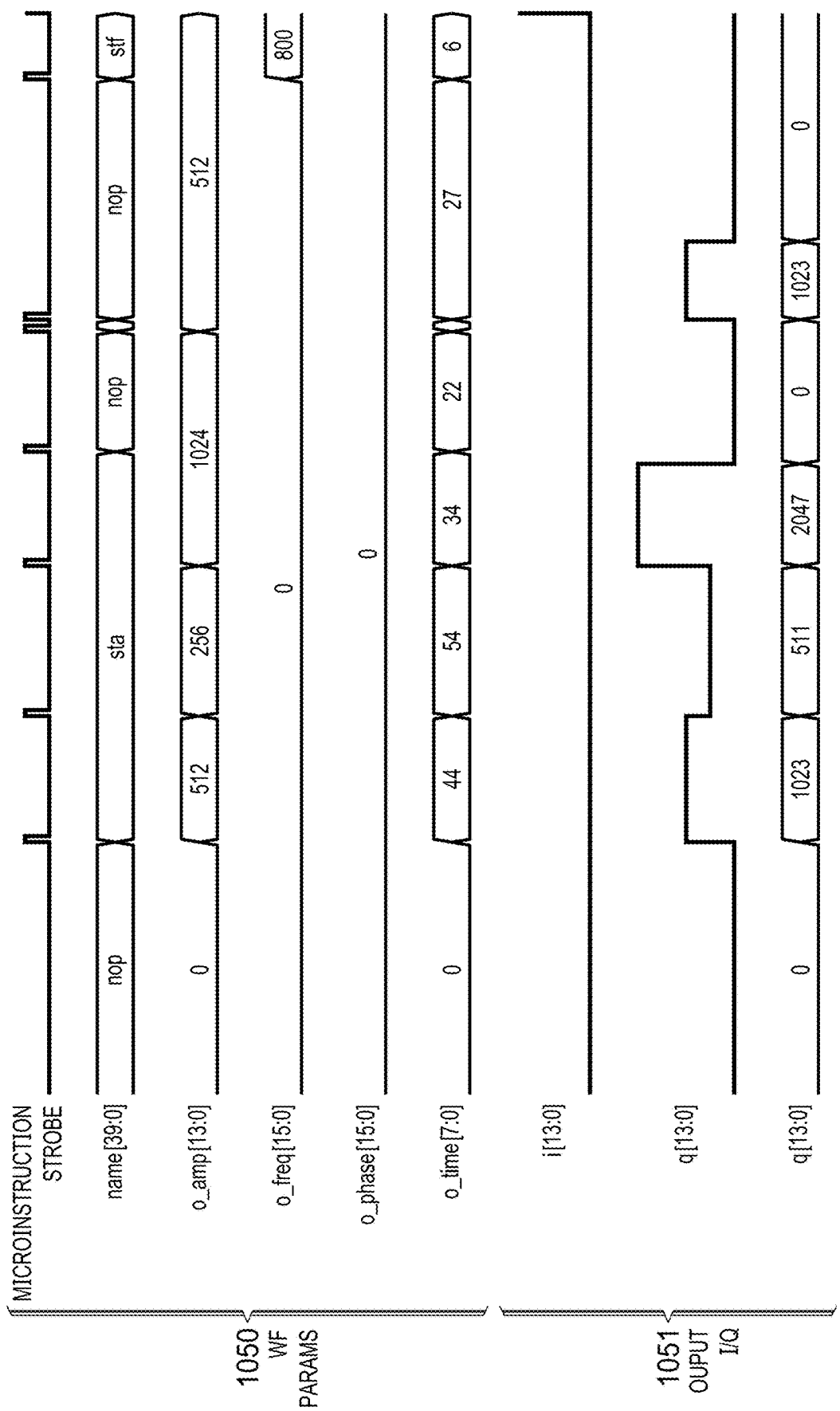

FIG. 10A illustrates a set of DDS-specific instructions 1025 and corresponding frequency changes 1005, phase offset changes 1010, and amplitude changes 1015 resulting in the I/Q analog output channels 1020. FIG. 10B illustrates changes to the waveform parameter values 1050 (e.g., amplitude, phase, frequency, time, etc) and the resulting changes to the output I/Q signal 1051.

Adaptive Qubit Readout with Automatic Calibration

In Si-spin qubit systems and superconducting qubit systems, qubit readout involves qubit state discrimination through demodulating a readout signal and detecting whether it crosses a certain threshold to determine if the qubit is in the ground state or an excited state. The threshold is usually computed by digitizing the signal, filtering out the noise, analyzing the sampled signal and performing a statistical discrimination of the two observable states of the qubit. The threshold can be used to configure the readout system with the appropriate parameters whether it is performed on a computer or using a test instrument. The threshold can shift through time and after each recalibration and thus this analysis is repeated each time. This repetitive and manual process introduces a significant time overhead, slowing the execution of the quantum computing experiments and requiring human intervention and processing time.

To address these problems, one embodiment of the invention comprises a qubit measurement unit capable of auto-calibration. When in calibration mode, the measurement unit digitizes readout signals with known measurement outcomes (e.g., ground state and excited state) and unknown outcomes (e.g., random measurements covering both ground and exited states with equal probabilities due to qubit state superposition) and performs the required signal processing and statistical sampling to determine the threshold automatically. Once determined, it configures the threshold in the measurement discrimination unit. The recalibration process can be performed periodically to keep the measurement unit operational without human intervention.

Figure 11:
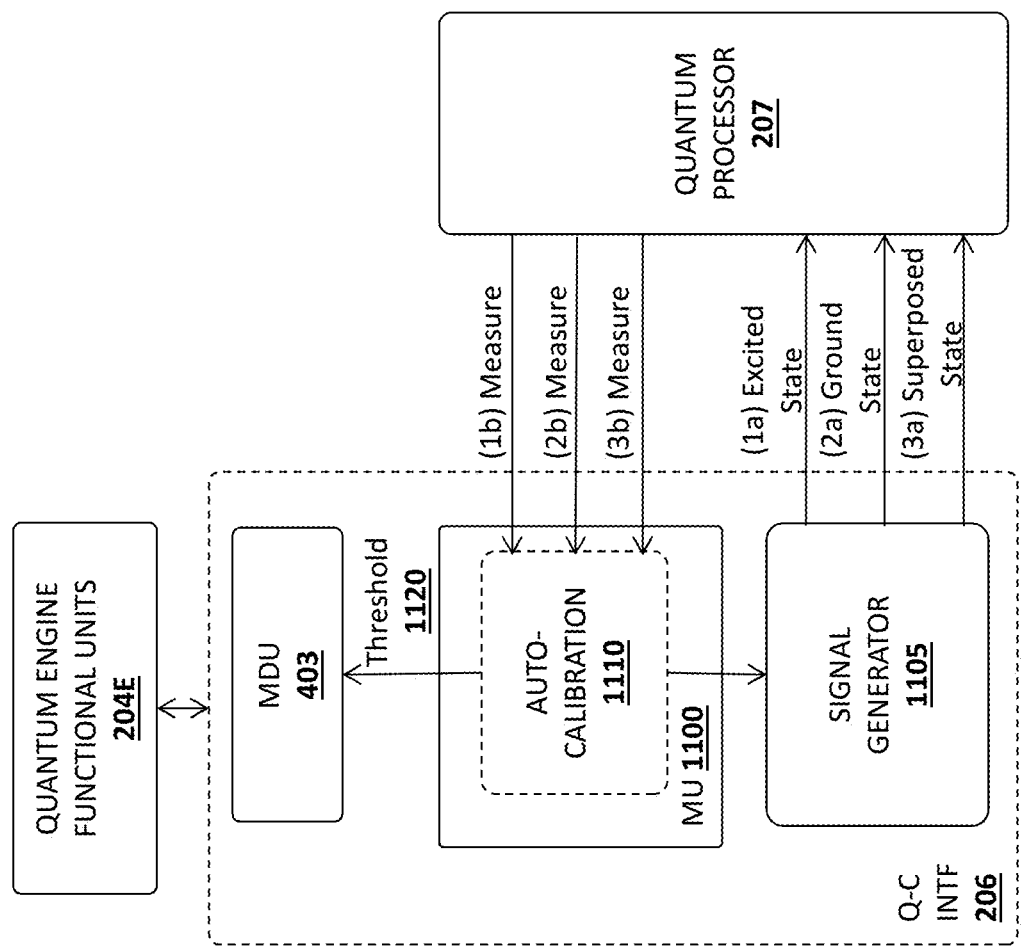
FIG. 11 illustrates one particular embodiment with a signal generator, measurement unit, and measurement discrimination.
Figure 12A:
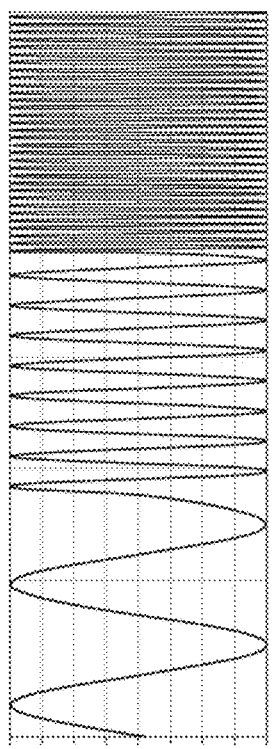
FIGS. 12A-C illustrate examples of different signal manipulation techniques including frequency modulations and envelope shaping.
Figure 12B:
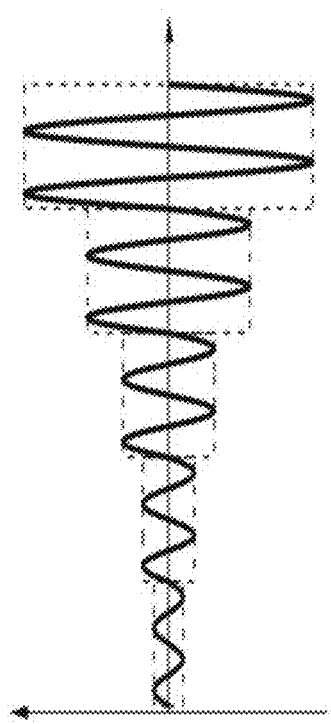
Figure 12C:
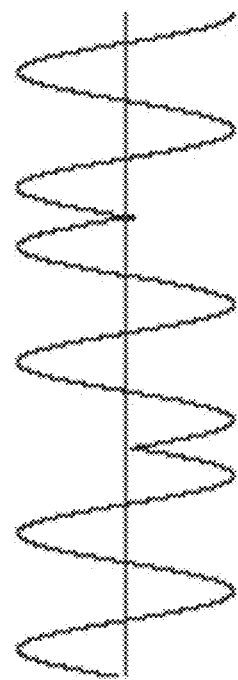

FIG. 11 illustrates one particular embodiment with a signal generator 1105, measurement unit 1100, and measurement discrimination unit 403. The signal generator 1105 may include the uop units 401A-C and CTPG units 402A-C as shown in FIG. 4 and/or may include the direct digital synthesis (DDS) core 690 as shown in FIG. 6 to generate RF pulses to control qubits of the quantum processor 207 (e.g., in response to quantum instructions executed by the quantum engine functional units 204E). Similarly, the MU 1100 may perform qubit measurements and the MDU 403 may perform measurement discrimination operations as described, for example, with respect to FIGS. 4-5.

In one embodiment, the MU 1100 includes auto-calibration circuitry/logic 1110 to implement the automatic calibration techniques described herein. In particular, the MU 1100 may enter into an auto-calibration mode periodically and/or in response to a command. When in the calibration mode, the auto-calibration circuitry/logic 1110 performs the following operations.

First, the auto-calibration circuitry/logic 1110 specifies a sequence of operations to be performed by the signal generator 1105. In one embodiment, the sequence of operations comprises: (1a) preparing the qubit in the excited state and (1b) measuring it; (2a) preparing the qubit in the ground state and (2b) measuring it; and (3a) preparing the qubit in a superposed state and (3b) measuring it.

Since this sequence of qubit operations and measurements covers all the potential qubit states. In one implementation, the MU 1100 digitizes the measurement readout signals and the auto-calibration circuitry/logic 1110 performs a statistical analysis to compute the minimum, maximum, mean and standard deviation of the magnitude of the readout signals. In this embodiment, the standard deviation is used to remove the outlier data points to increase immunity to noise. The auto-calibration circuitry/logic 1110 then determines the threshold 1120 by computing the average of the remaining relevant samples. It then configures the threshold 1120 in the measurement discrimination unit 403. As mentioned, this The recalibration process can be performed periodically to keep the measurement unit operational without human intervention.

In the embodiment in FIG. 11, the auto-calibration circuitry/logic 1110 performs a sequence of operations with known measurement outcomes. Alternatively, or in addition, the auto-calibration circuitry/logic 1110 may perform operations with unknown outcomes such as random measurements covering both ground and exited states with equal probabilities due to qubit state superposition. It may then perform the required signal processing and statistical sampling to determine the threshold 1120.

Figure 13A:
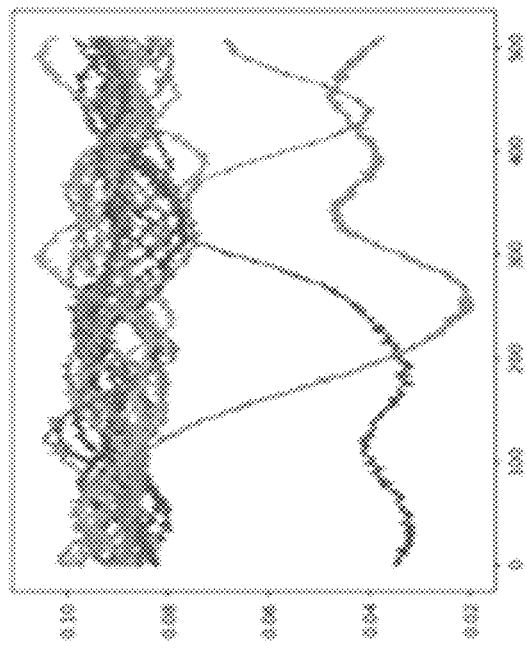
FIGS. 13A-B illustrates samples of digitized readout signals corresponding to ground and excited state measurements.
Figure 13A:
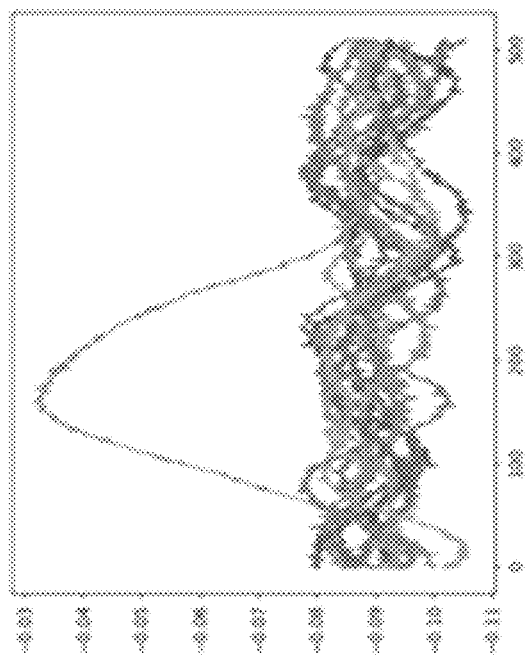
Figure 13B:
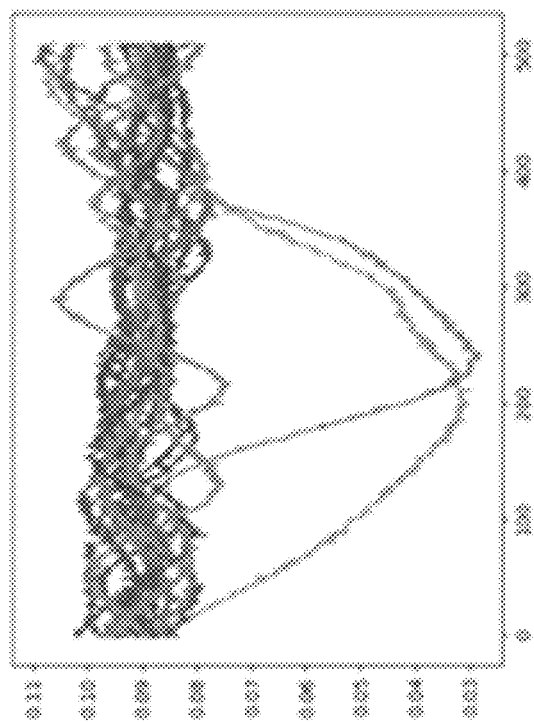
Figure 13B:
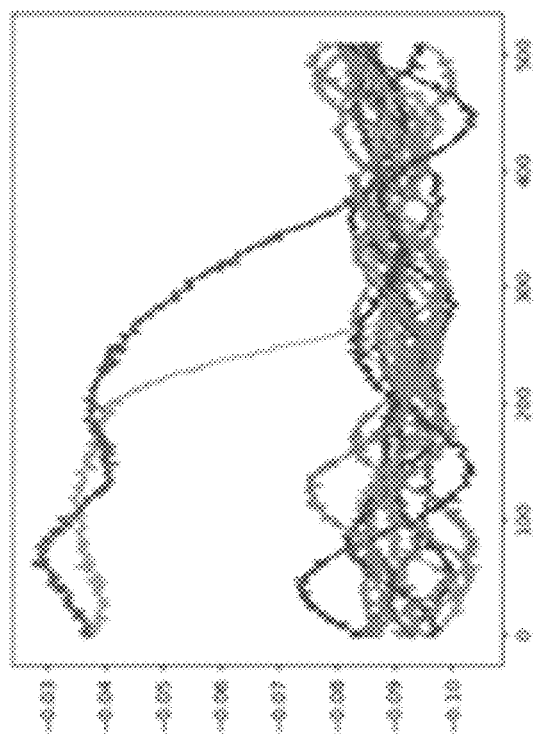

FIGS. 13A-B illustrates samples of digitized readout signals corresponding to ground and excited state measurements. Note that the mathematical operations involved in the statistical analysis performed by the auto-calibration circuitry/logic 1110 can be realized efficiently on hardware with very low memory overhead. In one embodiment, the readout signals are sampled and streamed through a processing pipeline which compute the relevant parameters without storing the sampled signal in memory.

The auto-calibration techniques described above significantly improve the calibration process of the qubit readout system and makes the measurement unit ready for measuring qubits in few seconds. In the case of parameter drift over time, a fast recalibration could recover and update the readout parameters periodically. Self-calibration will allow the measurement unit 1100 to be operational without storing a large amount of data for offline processing. Adaptive measurement also allows the measurement unit 1100 to adapt to different qubit systems and parameter drift on the same system. Furthermore, these techniques do not require a manual analysis of recorded signals, ensuring efficient calibration, high system availability and limited user intervention.

Programmable Adiabatic Pulse Synthesis for Efficient Qubit Control

Accurate qubit control requires repetitive and time-consuming calibration and tuning procedures such as spectroscopy. These routines, which need to be performed periodically to avoid drift, attempt to identify the optimal qubit control parameters such the frequency and control pulse magnitude. These routines involve sweeping over different parameters of the pulses including amplitude and frequency. The sweeps are often built manually by constructing samples of the waveforms and uploading them to the waveform generator which introduces significant time and memory overhead.

One embodiment of the invention provides for more efficient calibration routines by automating the adiabatic pulse synthesis and enabling fast and programmable sweeping over frequency, phase, and/or amplitude in a memory-efficient way. In particular, a new instruction set initiates adiabatic pulses by sweeping over frequency, amplitude and phase. The instructions are referred to herein as SWPF (sweep frequency), SWPA (sweep amplitude), and SWP (sweep phase).

These instructions may be executed on the various direct digital synthesis architectures described herein (see, e.g., DDS core 690) which decode the instruction parameters such as the starting frequency, frequency step and the number of steps, to synthetize a frequency sweep through driving a DDS core. In response, the DDS core samples the waveform and feeds a DAC to convert the digital samples to an analog signal.

Figure 14B:
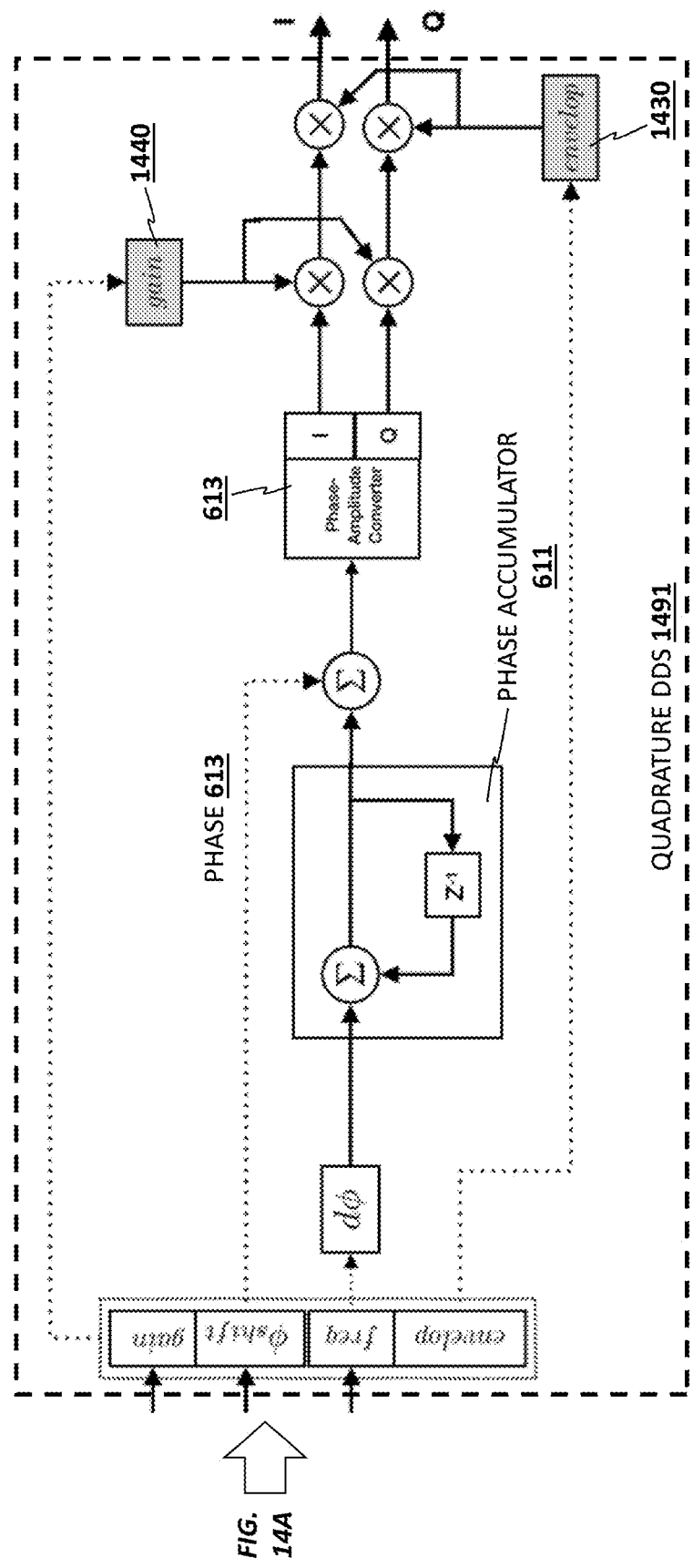

FIGS. 14A-B illustrates one embodiment of an architecture for initiating adiabatic pulses in response to the fields/operands of an instruction 1400. The instruction execution circuitry comprises an adiabatic pulse generator circuit 1490 (FIG. 14A) and a quadrature direct digital synthesis (DDS) circuit 1491 (FIG. 14B). The target sweep parameter is computed and updated incrementally by the adiabatic pulse generator 1490 at each time step. The input of the pulse generator is composed of the starting value of the parameter, the increment step and the number of steps. For instance, the "swf" instruction provides the staring frequency, the frequency step, the number of steps and finally the duration of each step.

The adiabatic pulse generator drives 1490 the quadrature DDS circuit 1491 by updating the swept parameter at each time step. The quadrature DDS circuit 1491 may use a fixed-size memory where the phase and amplitude of the sine wave is stored, although additional memory may be required.

In operation, a gain circuit 1401A of the adiabatic pulse generator 1490 supplies a gain value, starting with the gain specified in a gain field/operand of the instruction 1400. This gain value is then incrementally updated based on an increment value, dg 1404A, and a number of steps, $N_{gs}$, provided in corresponding instruction fields. An accumulator 1402A increases the gain by the increment value 1404A until the number of steps, $N_{gs}$, has been reached, as detected by a comparator 1403A.

Similarly, a phase shift circuit 1401B of the adiabatic pulse generator 1490 supplies a phase shift value, starting with the phase shift specified in a phase shift field/operand of the instruction 1400. This phase shift value is then incrementally updated based on an increment value, dp 1404B, and a number of steps, $N_{ps}$, provided in corresponding instruction fields. An accumulator 1402B increases the phase shift by the increment value 1404A until the number of steps, $N_{ps}$, has been reached, as detected by a comparator 1403A.

Finally, a frequency circuit 1401C of the adiabatic pulse generator 1490 supplies a frequency value, starting with the frequency specified in a frequency field/operand of the instruction 1400. This frequency value is then incrementally updated based on an increment value, dg 1404C, and a number of steps, $N_{fs}$, provided in corresponding instruction fields. An accumulator 1402C increases the frequency by the increment value 1404C until the number of steps, $N_{fs}$, has been reached, as detected by a comparator 1403C.

As illustrated in FIG. 14B, the gain, phase shift, and frequency signals, and an envelope signal are provided to the quadrature DDS 1491, which operates as described above with respect to FIGS. 6, 7, and/or 8. In particular, the frequency value sets the sample count rate for the phase accumulator 611, thereby adjusting the frequency of the signal being synthesized. The value at the output of the phase accumulator 611 represents the phase of the signal versus time and may be adjusted by the phase offset value 613 from the adiabatic pulse generator 1490. The adjusted phase value is then used as an index to a phase-to-amplitude converter 613, which outputs samples with amplitudes based on the input phase value.

The I and Q components of the resulting signal may be adjusted by the gain value 1440 provided by the adiabatic pulse generator 1490 and/or may be shaped by an envelope control value 1430 as described above.

One embodiment of a SWPF instruction causes the execution circuitry to sweep over a frequency range. For example, the following instruction produces a chirp pulse on channel 2 starting from a 10 MHz frequency to a 20 MHz frequency by 20 steps of 500 KHz each, and lasting 100 ns:

SWPF Ch2, 10 MHz, 500 KHz, 20, 100 ns

One embodiment of a SWA instruction causes the execution circuitry to sweep over an amplitude range. For example, the following instruction produces a pulse on channel 3 starting from an amplitude of 0 mV to an amplitude of 100 mV by 10 steps of 10 mV each, and lasting 200 ns:

SWPA Ch3, 0 mV, 10 mV, 10, 200 ns

One embodiment of a SWP instruction causes the execution circuitry to sweep across a phase range. For example, the following instruction produces a pulse on channel 1 starting from a 90 degree phase and increases the phase by 90 degrees in four increments, and lasting 500 ns:

SWPF Ch1, 90 deg, 90 deg, 4, 500 ns

The embodiments of the invention improve programmability, memory efficiency, and time efficiency compared to existing systems. For example, pulse synthesis using instructions significantly improves user productivity and automates a traditionally manual and time-consuming process. The signal synthesis core relies on a Direct Digital Synthesis (DDS) circuit to synthetize the pulses and does not require storing arbitrary waveform samples, alleviating memory overhead. Moreover, the above embodiments significantly reduce the qubit calibration and tuning time and help to maintain optimal qubit control even when the qubit parameters drift within a relatively short time period.

Previous solutions include mainly "manual" construction of a large number of waveforms corresponding to the desired sweeps. The waveforms are generated using software packages and their samples are uploaded to arbitrary waveform generators. This process introduces a time overhead for computing and generating the waveform samples, as well as a significant memory-overhead, especially when the parameter sweeping space is large and requires a very large number of pulse variants. Since the memory size of the waveform generator is limited, the calibration routines may need to be performed in steps by uploading a subset of the waveforms at each step, thereby increasing the time overhead.

EXAMPLES

The following are example implementations of different embodiments of the invention.

Example 1. An apparatus comprising a quantum instruction processing pipeline to process a quantum instruction having one or more opcodes to specify quantum operations and one or more operands and/or fields to specify values to be used to perform the quantum operations; a quantum waveform synthesizer to synthesize a waveform to control a qubit based on the values specified by the operands and/or fields of the quantum instruction.

Example 2. The apparatus of example 1 wherein the values comprise one or more of: a frequency value and a phase value.

Example 3. The apparatus of example 2 wherein the quantum waveform synthesizer comprises: a phase accumulator to generate samples at a rate specified based on the frequency value, the phase accumulator to generate a first signal having a first phase; and a phase adder to add the phase value to the first phase to generate a second signal having a second phase.

Example 4. The apparatus of example 3 wherein the quantum waveform synthesizer further comprises: a phase-to-amplitude converter to generate a third signal having a variable amplitude based on phase values of the second signal.

Example 5. The apparatus of example 4 further comprising an analog-to-digital (A/D) converter to convert the second or third signal to an analog waveform to control the qubit.

Example 6. The apparatus of example 5 further comprising wave shaping circuitry to adjust the first, second, or third signals, or the analog waveform based on a shaping waveform to generate an output signal.

Example 7. The apparatus of example 6 wherein the shaping waveform is to be selected in accordance with a first value specified in a first operand and/or first field of the quantum instruction and the amplitude is to be selected in accordance with a second value specified in a second operand and/or field of the quantum instruction.

Example 8. The apparatus of example 7 further comprising signal correction circuitry to compensate for gain/phase distortions, DC imbalances, and/or undesired sideband tones in the output signal to generate a corrected output signal.

Example 9. The apparatus of example 1 wherein the quantum instruction processing pipeline comprises a decoder to decode a stream of quantum instructions including the quantum instruction and responsively generate quantum microoperations identifying the values used to perform the quantum operations; dispatch/timing control circuitry to dispatch one or more of the microoperations to the quantum waveform synthesizer to cause the quantum waveform synthesizer to control the qubit; and one or more additional quantum waveform synthesizers, wherein the dispatch/timing control circuitry is to dispatch different sets of the microoperations to different quantum waveform synthesizers.

Example 10. The apparatus of example 1 wherein the quantum operations comprise a qubit rotation and wherein the one or more operands and/or fields specify values to be used by the quantum waveform synthesizer to perform the qubit rotation.

Example 11. A method comprising processing a quantum instruction having one or more opcodes to specify quantum operations and one or more operands and/or fields to specify values to be used to perform the quantum operations; synthesizing a waveform to control a qubit based on the values specified by the operands and/or fields of the quantum instruction.

Example 12. The method of example 11 wherein the values comprise one or more of: a frequency value and a phase value.

Example 13. The method of example 12 further comprising generating samples at a rate specified based on the frequency value to produce a first signal having a first phase; and adding the phase value to the first phase to generate a second signal having a second phase.

Example 14. The method of example 13 further comprising: generating a third signal having a variable amplitude based on phase values of the second signal.

Example 15. The method of example 14 further comprising: converting the second or third signal to an analog waveform to control the qubit.

Example 16. The method of example 15 further comprising: adjusting the first, second, or third signals, or the analog waveform based on a shaping waveform to generate an output signal.

Example 17. The method of example 16 wherein the shaping waveform is to be selected in accordance with a first value specified in a first operand and/or first field of the quantum instruction and the amplitude is to be selected in accordance with a second value specified in a second operand and/or field of the quantum instruction.

Example 18. The method of example 17 further comprising compensating for gain/phase distortions, DC imbalances, and/or undesired sideband tones in the output signal to generate a corrected output signal.

Example 19. The method of example 11 further comprising decoding a stream of quantum instructions including the quantum instruction and responsively generating quantum microoperations identifying the values used to perform the quantum operations; dispatching one or more of the microoperations to a quantum waveform synthesizer to cause the quantum waveform synthesizer to synthesize the waveform to control the qubit; and dispatching different sets of the microoperations to different quantum waveform synthesizers.

Example 20. The method of example 11 wherein the quantum operations comprise a qubit rotation and wherein the one or more operands and/or fields specify values to be used to perform the qubit rotation.

Example 21. A machine-readable medium having program code stored thereon which, when executed by a machine, causes the machine to perform the operations of processing a quantum instruction having one or more opcodes to specify quantum operations and one or more operands and/or fields to specify values to be used to perform the quantum operations; synthesizing a waveform to control a qubit based on the values specified by the operands and/or fields of the quantum instruction.

Example 22. The machine-readable medium of example 21 wherein the values comprise one or more of: a frequency value and a phase value.

Example 23. The machine-readable medium of example 22 further comprising program code to cause the machine to perform the operations of generating samples at a rate specified based on the frequency value to produce a first signal having a first phase; and adding the phase value to the first phase to generate a second signal having a second phase.

Example 24. The machine-readable medium of example 23 further comprising program code to cause the machine to perform the operations of generating a third signal having a variable amplitude based on phase values of the second signal.

Example 25. The machine-readable medium of example 24 further comprising program code to cause the machine to perform the operations of converting the second or third signal to an analog waveform to control the qubit.

Example 26. The machine-readable medium of example 25 further comprising program code to cause the machine to perform the operations of adjusting the first, second, or third signals, or the analog waveform based on a shaping waveform to generate an output signal.

Example 27. The machine-readable medium of example 26 wherein the shaping waveform is to be selected in accordance with a first value specified in a first operand and/or first field of the quantum instruction and the amplitude is to be selected in accordance with a second value specified in a second operand and/or field of the quantum instruction.

Example 28. The machine-readable medium of example 27 further comprising program code to cause the machine to perform the operations of compensating for gain/phase distortions, DC imbalances, and/or undesired sideband tones in the output signal to generate a corrected output signal.

Example 29. The machine-readable medium of example 11 further comprising program code to cause the machine to perform the operations of decoding a stream of quantum instructions including the quantum instruction and responsively generating quantum microoperations identifying the values used to perform the quantum operations; dispatching one or more of the microoperations to a quantum waveform synthesizer to cause the quantum waveform synthesizer to synthesize the waveform to control the qubit; and dispatching different sets of the microoperations to different quantum waveform synthesizers.

Example 30. The machine-readable medium of example 11 wherein the quantum operations comprise a qubit rotation and wherein the one or more operands and/or fields specify values to be used to perform the qubit rotation.

In the above detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments. Terms like "first," "second," "third," etc. do not imply a particular ordering, unless otherwise specified.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

The invention claimed is:

1. An apparatus comprising:
a quantum instruction processing pipeline to process a quantum instruction having one or more opcodes to specify quantum operations and one or more operands and/or fields to specify values to be used to perform the quantum operations;
a quantum waveform synthesizer to synthesize a waveform to control a qubit based on the values, including one or more of a frequency value and a phase value, specified by the operands and/or fields of the quantum instruction, the quantum wave synthesizer comprising:
a phase accumulator to generate samples at a rate specified based on the frequency value, the phase accumulator to generate a first signal having a first phase; and
a phase adder to add the phase value to the first phase to generate a second signal having a second phase;
a decoder to decode a stream of quantum instructions including the quantum instruction and responsively generate quantum microoperations identifying the values used to perform the quantum operations; and
dispatch/timing control circuitry to dispatch one or more of the quantum microoperations to the quantum waveform synthesizer to cause the quantum waveform synthesizer to control the qubit.

2. The apparatus of claim 1 wherein the quantum waveform synthesizer further comprises:
a phase-to-amplitude converter to generate a third signal having a variable amplitude based on phase values of the second signal.

3. The apparatus of claim 2 further comprising:
an analog-to-digital (A/D) converter to convert the second or third signal to an analog waveform to control the qubit.

4. The apparatus of claim 3 further comprising:
wave shaping circuitry to adjust the first, second, or third signals, or the analog waveform based on a shaping waveform to generate an output signal.

5. The apparatus of claim 4 wherein the shaping waveform is to be selected in accordance with a first value specified in a first operand and/or first field of the quantum instruction and the amplitude is to be selected in accordance with a second value specified in a second operand and/or field of the quantum instruction.

6. The apparatus of claim 5 further comprising:
signal correction circuitry to compensate for gain/phase distortions, DC imbalances, and/or undesired sideband tones in the output signal to generate a corrected output signal.

7. The apparatus of claim 1 wherein the quantum instruction processing pipeline comprises:
one or more additional quantum waveform synthesizers, wherein the dispatch/timing control circuitry is to dispatch different sets of the quantum microoperations to different quantum waveform synthesizers.

8. The apparatus of claim 1 wherein the quantum operations comprise a qubit rotation and wherein the one or more operands and/or fields specify values to be used by the quantum waveform synthesizer to perform the qubit rotation.

9. A method comprising:
processing a quantum instruction having one or more opcodes to specify quantum operations and one or more operands and/or fields to specify values to be used to perform the quantum operations;
decoding a stream of quantum instructions including the quantum instruction and responsively generating quantum microoperations identifying the values used to perform the quantum operations;
dispatching one or more of the quantum microoperations to a quantum waveform synthesizer to cause the quantum waveform synthesizer to synthesize a waveform to control a qubit based on the values including one or more of a frequency value and a phase value; and synthesizing, by the quantum waveform synthesizer, the waveform to control the qubit responsive to the quantum microoperations, wherein the synthesizing comprises:
generating samples at a rate specified based on the frequency value to produce a first signal having a first phase; and
adding the phase value to the first phase to generate a second signal having a second phase.

10. The method of claim 9 further comprising:
generating a third signal having a variable amplitude based on phase values of the second signal.

11. The method of claim 10 further comprising:
converting the second or third signal to an analog waveform to control the qubit.

12. The method of claim 11 further comprising:
adjusting the first, second, or third signals, or the analog waveform based on a shaping waveform to generate an output signal.

13. The method of claim 12 wherein the shaping waveform is to be selected in accordance with a first value specified in a first operand and/or first field of the quantum instruction and the amplitude is to be selected in accordance with a second value specified in a second operand and/or field of the quantum instruction.

14. The method of claim 13 further comprising:
compensating for gain/phase distortions, DC imbalances, and/or undesired sideband tones in the output signal to generate a corrected output signal.

15. The method of claim 9 further comprising:
dispatching different sets of the quantum microoperations to different quantum waveform synthesizers.

16. The method of claim 9 wherein the quantum operations comprise a qubit rotation and wherein the one or more operands and/or fields specify values to be used to perform the qubit rotation.

17. A machine-readable medium having program code stored thereon which, when executed by a machine, causes the machine to perform the operations of:
processing a quantum instruction having one or more opcodes to specify quantum operations and one or more operands and/or fields to specify values to be used to perform the quantum operations;
decoding a stream of quantum instructions including the quantum instruction and responsively generating quantum microoperations identifying the values used to perform the quantum operations;
dispatching one or more of the quantum microoperations to a quantum waveform synthesizer to cause the quantum waveform synthesizer to synthesize a waveform to control a qubit based on the values including one or more of a frequency value and a phase value; and
synthesizing, by the quantum waveform synthesizer, the waveform to control the qubit responsive to the quantum microoperations, wherein the synthesizing comprises:
generating samples at a rate specified based on the frequency value to produce a first signal having a first phase; and
adding the phase value to the first phase to generate a second signal having a second phase.

18. The machine-readable medium of claim 17 further comprising program code to cause the machine to perform the operations of:
generating a third signal having a variable amplitude based on phase values of the second signal.

19. The machine-readable medium of claim 18 further comprising program code to cause the machine to perform the operations of:
converting the second or third signal to an analog waveform to control the qubit.

20. The machine-readable medium of claim 19 further comprising program code to cause the machine to perform the operations of:
adjusting the first, second, or third signals, or the analog waveform based on a shaping waveform to generate an output signal.

21. The machine-readable medium of claim 20 wherein the shaping waveform is to be selected in accordance with a first value specified in a first operand and/or first field of the quantum instruction and the amplitude is to be selected in accordance with a second value specified in a second operand and/or field of the quantum instruction.

22. The machine-readable medium of claim 21 further comprising program code to cause the machine to perform the operations of:
compensating for gain/phase distortions, DC imbalances, and/or undesired sideband tones in the output signal to generate a corrected output signal.

23. The machine-readable medium of claim 17 further comprising program code to cause the machine to perform the operations of:
dispatching different sets of the quantum microoperations to different quantum waveform synthesizers.

24. The machine-readable medium of claim 17 wherein the quantum operations comprise a qubit rotation and wherein the one or more operands and/or fields specify values to be used to perform the qubit rotation.

* * * * *